(12) United States Patent
Piecuch et al.

(10) Patent No.: US 12,306,494 B1
(45) Date of Patent: May 20, 2025

(54) COMPOUND BACKLIGHT WITH EDGE LIGHTING

(71) Applicant: Microsoft Technology Licensing, LLC, Redmond, WA (US)

(72) Inventors: Scott Piecuch, Seattle, WA (US); Nobuyuki Suzuki, Kirkland, WA (US); Ying Zheng, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/516,288

(22) Filed: Nov. 21, 2023

(51) Int. Cl.
G02F 1/1335 (2006.01)
F21V 8/00 (2006.01)
G02F 1/13357 (2006.01)

(52) U.S. Cl.
CPC ..... *G02F 1/133555* (2013.01); *G02B 6/0031* (2013.01); *G02B 6/0036* (2013.01); *G02B 6/0068* (2013.01); *G02B 6/0091* (2013.01); *G02F 1/133603* (2013.01); *G02F 1/133607* (2021.01); *G02F 1/133615* (2013.01); *G02F 2203/09* (2013.01)

(58) Field of Classification Search
CPC ............... G02B 6/0068; G02B 6/0091; G02F 1/133555; G02F 1/133603–133614; G02F 2203/09
See application file for complete search history.

(56) References Cited

U.S. PATENT DOCUMENTS

2007/0081321 A1  4/2007  Ahn
2008/0252575 A1  10/2008  Brown et al.
(Continued)

FOREIGN PATENT DOCUMENTS

CN  113504669 A  10/2021
CN  115616816 A  1/2023
WO  2017159111 A1  9/2017

OTHER PUBLICATIONS

Gao, et al.,"Mini-LED Backlight Technology Progress for Liquid Crystal Display", In Journals of Crystals 2022, vol. 12, Issue 3, Feb. 23, 2022, pp. 1-19.
(Continued)

*Primary Examiner* — Keith G. Delahoussaye
(74) *Attorney, Agent, or Firm* — Weaver IP L.L.C.

(57) ABSTRACT

Display devices, display systems, backlight assemblies, and methods described herein provide compound backlights with edge lighting. In an aspect, the backlight includes a waveguide, first lights, and an array layer. The first lights are arranged along an edge of the waveguide. Each of the first lights transmits light into the waveguide. The array layer is coupled to the waveguide and comprises a reflective layer and second lights. The reflective layer reflects the light transmitted by the first lights into the waveguide. The second lights are arranged between the waveguide and the reflective layer. Each of the second lights transmits light into the waveguide layer through the first surface. In a further aspect, the second lights are oriented away from the waveguide and toward the reflective surface. In another aspect, a compound backlight includes a reflective surface, arranged between a waveguide and second lights, that reflects a portion of received light.

20 Claims, 8 Drawing Sheets

(56) References Cited

U.S. PATENT DOCUMENTS

| | | | |
|---|---|---|---|
| 2012/0235891 A1* | 9/2012 | Nishitani | G02F 1/1323 |
| | | | 345/102 |
| 2017/0148393 A1 | 5/2017 | Peana | |
| 2018/0226014 A1* | 8/2018 | Komanduri | H10K 50/85 |
| 2020/0209685 A1 | 7/2020 | Nakamura | |
| 2021/0142744 A1 | 5/2021 | Martinez et al. | |
| 2023/0288753 A1* | 9/2023 | Shiau | G02F 1/133603 |

OTHER PUBLICATIONS

International Search Report and Written Opinion received for PCT Application No. PCT/US2024/052284, mailed on Jan. 24, 2025, 31 pages.

* cited by examiner

500

502 Determine, based on the image data, an average luminance level of a first zone of the display area is below the threshold and an average luminance level of a second zone of the display area is above the threshold

504 Illuminate a portion of the plurality of first light sources corresponding to the first zone

506 Illuminate a portion of the plurality of second light sources corresponding to the second zone

FIG. 5

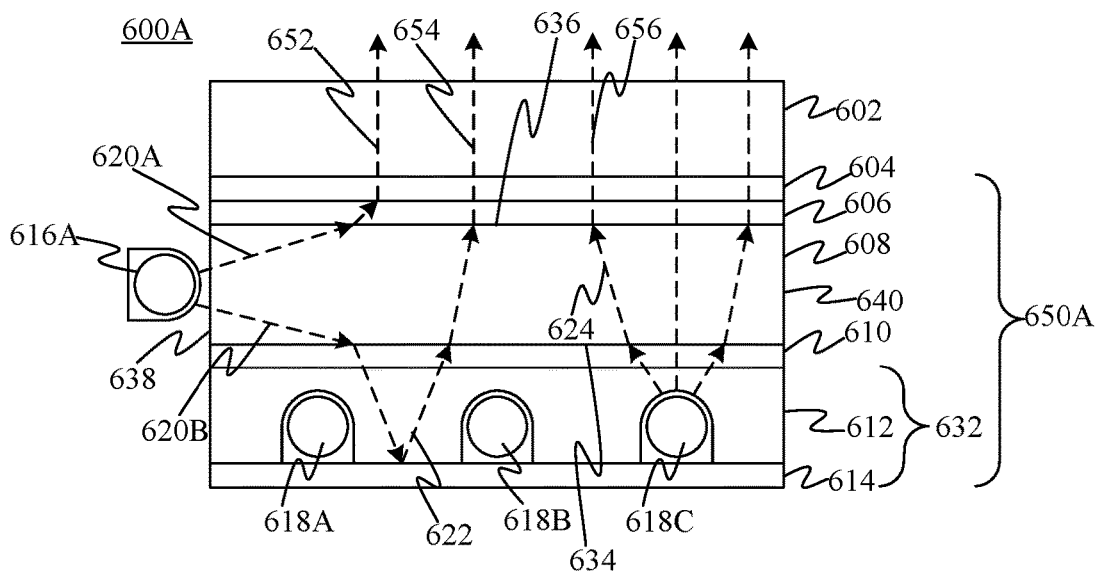

FIG. 6A

COMPOUND BACKLIGHT WITH EDGE LIGHTING

BACKGROUND

A backlight is a form of illumination used in liquid crystal displays (LCDs). Because an LCD does not produce its own light, another light source, the "backlight," illuminates the LCD so that a visible image is produced. LCDs with backlights are used in many electronic user devices, such as flat panel displays, LCD televisions, mobile devices such as cell phones, etc.

Some LCDs use a backlight that gives off a uniform light over its surface, such as an electroluminescent panel (ELP). Other LCDs use multiple light sources to enable localized dimming, such as light emitting diodes (LEDs), or cold or hot cathode fluorescent lamps (CCFLs or HCFLs). Some LCDs with localized dimming utilize miniLED arrays driven by multiple LED drivers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for a compound backlight with edge lighting. In an aspect, the backlight includes a transparent waveguide layer, a plurality of first light sources, and an array layer. The transparent waveguide layer has a first surface. The plurality of first light sources is arranged along an edge of the transparent waveguide layer. Each of the first light sources is configured to transmit light into the waveguide layer through the edge. The array layer is coupled to the first surface of the transparent waveguide layer and comprises a first reflective layer and a plurality of second light sources. The first reflective layer is configured to reflect the light transmitted by the plurality of first light sources into the waveguide layer through the first surface. The plurality of second light sources is arranged between the first surface and the reflective layer. Each of the second light sources is configured to transmit light into the waveguide layer through the first surface.

In a further aspect, the plurality of second light sources is mounted to a transparent sublayer. The plurality of second light sources is oriented toward the reflective layer and away from the first surface. To transmit light into the waveguide layer, the plurality of second light sources is configured to transmit light toward the reflective layer to cause the reflective layer to reflect the light transmitted by the plurality of second light sources into the waveguide layer through the first surface.

In another aspect, the backlight includes a transparent waveguide layer, a plurality of first light sources, an array layer, and a first reflective layer. The transparent waveguide layer has a first surface. The plurality of first light sources is arranged along an edge of the transparent waveguide layer. Each of the first light sources is configured to transmit light into the waveguide layer through the edge. The array layer comprises a first reflective layer and a plurality of second light sources. Each of the second light sources is configured to transmit light into the waveguide layer through the first surface. The first reflective layer is arranged between the first surface of the transparent waveguide layer and the array layer. The first reflective layer is configured to reflect a portion of the light transmitted by the plurality of first light sources into the waveguide layer through the first surface.

In a further aspect of the another aspect, the first reflective layer is configured to reflect a portion of the light transmitted by the plurality of second light sources away from the first surface.

In a further aspect of the another aspect, the first reflective layer comprises a color conversion sublayer and a color reflective sublayer. The color conversion sublayer is configured to convert the light transmitted by the plurality of second light sources from a first color to a second color. The color reflective sublayer is configured to reflect the portion of the light transmitted by the plurality of first light sources into the waveguide layer through the first surface.

In another aspect, a display device comprises a display layer, a backlight assembly, and a backlight controller. The backlight assembly comprises any of the backlights described herein. The display layer is disposed proximate to the backlight assembly and is configured to selectively filter the light emitted from the backlight assembly. The backlight controller is configured to receive image data and determine, based on the image data, an average luminance level of a display area of the display layer is below a threshold. Responsive to the determination, the backlight controller is configured to illuminate a portion of the plurality of first light sources.

In a further aspect of the display device, responsive to the determination, the backlight controller is configured to maintain the plurality of second light sources in an off state.

In a further aspect of the display device, the backlight controller is configured to determine, based on the image data, an average luminance level of a first zone of the display area is below the threshold and an average luminance level of a second zone of the display area is above the threshold. The backlight controller is configured to illuminate a portion of the plurality of second light sources corresponding to the second zone and illuminate a portion of the plurality of first light sources corresponding to the first zone.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 5 shows a flowchart of a process for illuminating a portion of light sources of a compound backlight, according to an example embodiment.

FIG. 6A shows a cross-sectional view of a display layer and a backlight assembly that includes edge light sources and array light sources, according to an example embodiment.

Figure 1:
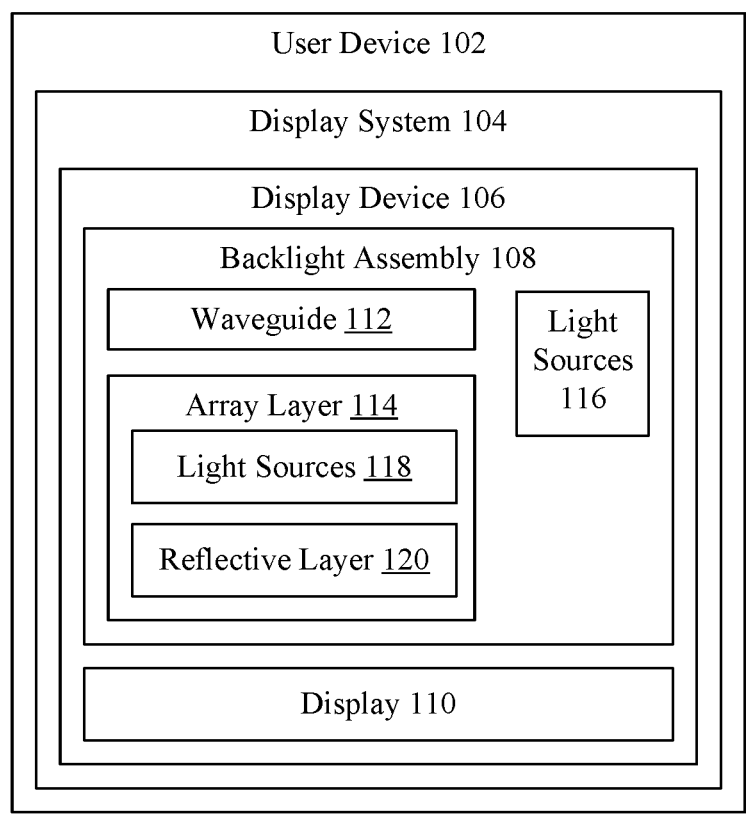
FIG. 1 shows a block diagram of a user device that includes a compound backlight with edge lighting, according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Compound Backlights with Edge Lighting

A backlight is a form of illumination used in liquid crystal displays (LCDs). Because an LCD does not produce its own light, another light source, the "backlight," illuminates the LCD so that a visible image is produced. LCDs with backlights are used in many electronic user devices, such as flat panel displays, LCD televisions, mobile devices such as cell phones, etc.

Some LCDs use a backlight that gives off a uniform light over its surface, while others use multiple light sources to enable localized dimming. For instance, some LCDs with localized dimming utilize miniLED arrays driven by LED drivers. A backlight controller may selectively illuminate LEDs of the miniLED array to achieve a high contrast ratio between illuminated and non-illuminated portions of a display area. To individually control LEDs or groups of the LEDs, some implementations utilize dedicated hardware for each LED. However, this requires a large amount of space and cost for the components to control the LEDs. Other implementations utilize multiple scanning backlight drivers that control respective portions of the LED array. The use of such scanning backlight drivers increases the power consumed by the LCD system.

Embodiments of the present disclosure provide a compound backlight that includes a light source array and edge-aligned light sources (also referred to as "edge lights"). The light source array is arranged beneath a waveguide layer of the compound backlight and the edge lights are arranged along an edge (or multiple edges) of the waveguide layer. Light sources of the light source array and/or edge lights may be LEDs or other types of light emitters. By including both a light source array and edge lights, drivers of portions of the light source array can be selectively disabled and edge lights may be illuminated to reduce power consumed by the backlight.

In some implementations of backlights utilizing edge lights, a portion of light emitted by the edge lights is lost. For instance, some of the light projected by an LED edge light would be directed toward the back of the backlight (i.e., toward the array) instead of toward the display panel. To compensate for this loss, the amount of light emitted by the edge lights may be increased; however, this increases power consumed by the edge lights. Embodiments of the present disclosure further provide various compound backlight assemblies that include one or more reflective layers positioned to reflect (e.g., at least a portion of) light emitted by the edge lights toward the display panel. Such embodiments have various advantages, including one or more of: 1) increased lighting output; 2) thinner backlight assemblies; 3) reduced number of light sources in a light source array; and/or 4) improved uniformity of the light source array. Each of these benefits is described briefly below, as well as elsewhere herein.

Increased Lighting Output—As noted herein, some of the light emitted by an edge light is directed away from the display panel of an LCD. Embodiments of the present disclosure include a reflective layer that reflects this portion of emitted light toward the display panel. In this manner, "lost" light is redirected out of the backlight, thereby increasing the light output by the backlight when utilizing edge lights.

Thinner Backlight Assembly—Implementations of backlights with light source arrays may utilize films or sheets of materials (e.g., "pyramid sheets") to scatter light emitted by the light sources of the array. By scattering the light, the light emitted by the backlight or a portion of the backlight is uniform (or near uniform). The thickness of the backlight assembly increases as the number of pyramid sheets increases. In some embodiments described herein, backlights utilizing a reflective layer require fewer pyramid sheets in order to sufficiently scatter light emitted by light sources of the array; therefore, the overall thickness of the backlight is reduced.

Reduced Number of Light Sources in a Light Source Array—Light sources can be expensive. In some embodiments described herein, a reflective layer recirculates light emitted by the light source array (e.g., through pyramid sheets). This results in further spread (or scatter) of light emitted by a single light source within the array. Therefore, the array is able to illuminate the LCD display panel with fewer light sources.

Improved Uniformity in a Light Source Array—Light emitted from a light source in an array may form a "hot spot" in a display area directly above the light source. In some embodiments, light sources of the array are positioned in a manner that reduces or eliminates the presence of the hot spots, thereby improving the uniformity of the backlight when illuminating the light source array (or a portion of the light source array).

Backlights that include a light source array and edge-aligned light sources may be configured in various ways in embodiments. For instance, FIG. 1 shows a block diagram of a user device 102 that includes a compound backlight with edge lighting, according to an example embodiment. As shown in FIG. 1, user device 102 includes a display system 104, which includes a display device 106. Display device 106 includes a backlight assembly 108 and a display 110 (also referred to as a "display panel"). In accordance with an embodiment, display 110 is a liquid crystal display (LCD). Backlight assembly 108 comprises a waveguide 112 (e.g., a light guide plate), an array layer 114, and a plurality of light sources 116. Array layer 114 comprises a plurality of light sources 118 and a reflective layer 120. User device 102 is described as follows.

User device 102 may be any type of stationary or mobile electronic device that includes a display (touch sensitive or not touch sensitive), including, but not limited to, a desktop computer, a server, a mobile or handheld device (e.g., a tablet, a personal data assistant (PDA), a cell phone, a smart phone, a laptop, a netbook, etc.), a wearable computing device (e.g., a smart watch, a head-mounted device (e.g., smart glasses, a virtual reality headset, etc.), a display in an automobile (e.g., a dashboard, a navigation panel, an infotainment panel, etc.), a portable media player, a stationary or handheld gaming console, a personal navigation assistant, a camera, a television, an Internet-of-Things (IoT) device, or other type of electronic device.

Display system 104 is configured to enable the display of content by user device 102 on display device 106. In addition to display device 106, display system 104 includes any additional hardware and software and/or firmware used to enable display system 104 to display content. For example, display system 104 may include a graphics subsystem, one or more processors, and/or one or more memories (physical hardware) not shown in FIG. 1 for illustrative brevity.

Display device 106 displays visible content to users. In particular, backlight assembly 108 generates light (e.g., white light) that passes through, and is filtered by display 110 to impart color to the light. The colored light is emitted from display device 106 as content to be viewed by users. Backlight assembly 108 generates light using light sources 116, light sources 118, and/or a combination of light sources 116 and light sources 118. Light sources 116 (also referred to as "edge lights 116") line one or more edges of waveguide 112. Light sources 118 (also referred to as "array lights 118") are arranged beneath a surface of waveguide 112. Waveguide 112 is configured to guide transversal (or near transversal) light (e.g., light emitted by light sources 118) and to spread and guide orthogonal (or near orthogonal) light (e.g., light transmitted by light sources 118). For instance, light from light sources 116 enters into the one or more edges of waveguide 112 and is released to be filtered by display 110. Light from light sources 118 enters into waveguide 112 through the surface, is spread or otherwise distributed, and is released to be filtered by display 110.

As discussed above, some of the light emitted by light sources 116 is directed toward the back of backlight assembly 108 or otherwise away from display 110. Reflective layer 120 is configured to reflect at least a portion of the light emitted away from display 110 toward display 110. Reflective layer 120 may be a specular reflective surface (e.g., a mirror surface), a diffused reflective surface (e.g., a white diffusion reflective surface), or another type of reflective surface. In embodiments wherein reflective layer 120 is a specular reflective surface, the efficiency in which light is reflected by reflective layer 120 is increased. In embodiments wherein reflective layer 120 is a diffused reflective surface, the manufacturing cost of backlight assembly 108 may be reduced and light reflected by reflective layer 120 is dispersed in a uniform manner. In accordance with an embodiment, reflective layer 120 is arranged beneath light sources 118 (e.g., as described with respect to FIGS. 6A, 6B, and 9, as well as elsewhere herein). In accordance with another embodiment, reflective layer 120 is arranged between light sources 118 and waveguide 112 (e.g., as described with respect to FIGS. 7, 8, and 9, as well as elsewhere herein). In some embodiments, and as described with respect to FIG. 9 (as well as elsewhere herein), array layer 114 and/or backlight assembly 108 include multiple reflective layers. While reflective layer 120 is shown in FIG. 1 as a sub-layer of array layer 114, it is also contemplated herein that reflective layer 120 may be a separate layer from array layer 114.

Figure 2:
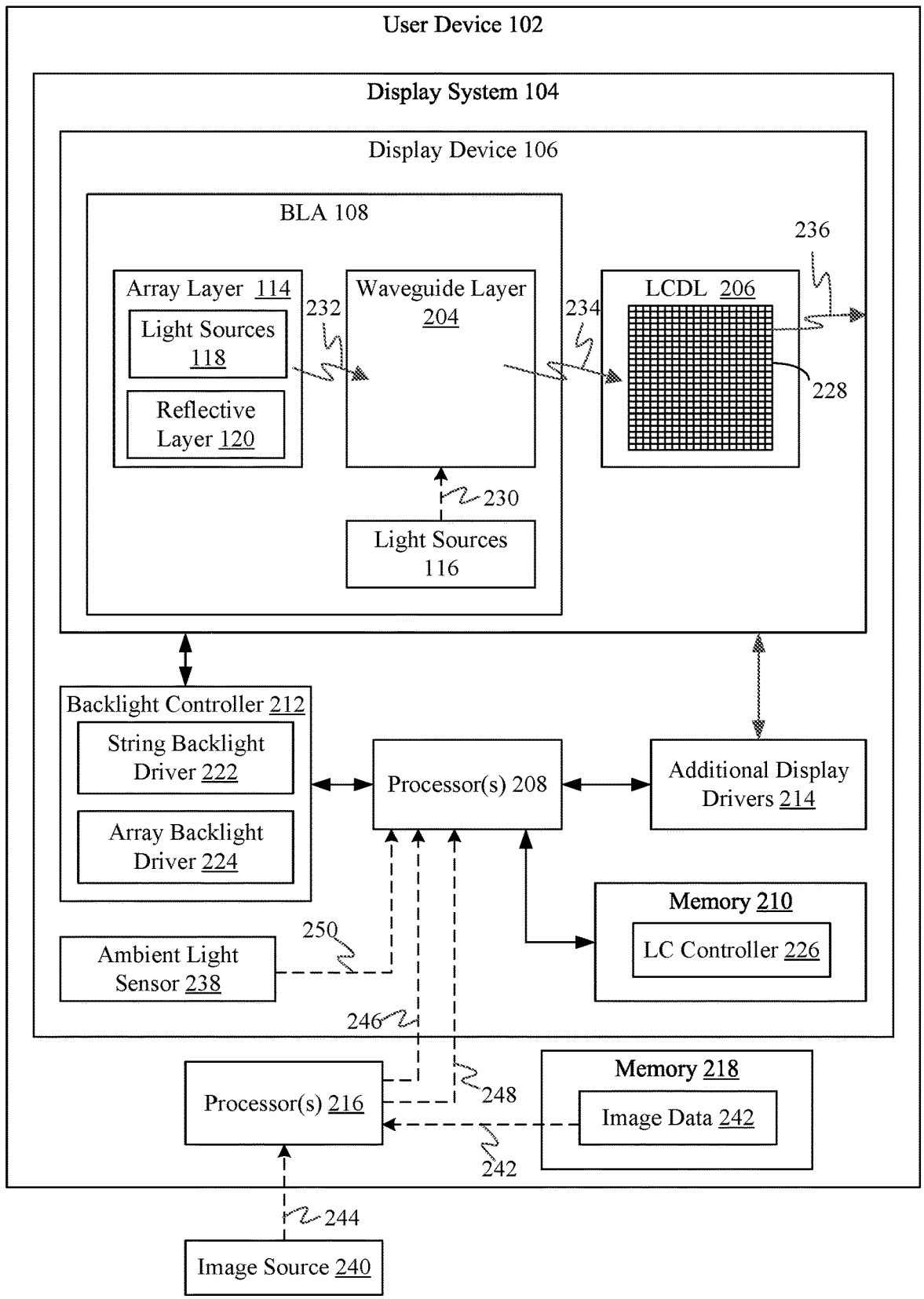
FIG. 2 shows a block diagram of a system that includes a user device with a compound backlight, according to an example embodiment.

User device 102, display system 104, and display device 106 may be configured in various ways to perform their functions. For instance, FIG. 2 shows a block diagram of a system 200 that includes a user device with a compound backlight, according to an example embodiment. As shown in FIG. 2, system 200 comprises user device 102 of FIG. 1 and an image source 240. As also shown in FIG. 2, user device 102 includes display system 104 (as described with respect to FIG. 1), one or more processors 216 ("processor 216" herein), and one or more memories 218 ("memory 218" herein). Memory 218 stores image data 242. Display system 104 includes display device 106 (as described with respect to FIG. 1), one or more processors 208 ("processor 208" herein), one or more memories 210 ("memory 210" herein), a backlight controller 212, one or more additional display drivers 214 ("display drivers 214" herein), and an ambient light sensor 238. Memory 210 stores LC controller 226. System 200 of FIG. 2 is described in further detail as follows.

Display system 104 is communicatively coupled to processor 216 and memory 218 to support the display of video or other images. For example, processor 216 may provide image data 246 indicative of each image frame of the video/images to display system 104. Image data 246 may be generated by processor 216, another component of user device 102, and/or obtained by processor 216. For instance, as shown in FIG. 2, processor 216 receives image data 242 from memory 218. In accordance with an embodiment, processor 216 provides image data 242 to display system 104 as image data 246. As also shown in FIG. 2, processor 216 receives image data 244 from image source 240 (e.g., via a communication interface of user device 102, not shown in FIG. 2 for brevity). In accordance with an embodiment, processor 216 provides image data 244 to display system 104 as image data 246. Examples of processor 216 include, but are not limited to, a central processing unit, a graphics-processing unit, and/or another processor or processing unit.

As noted above, processor 216 may receive image data 244 from image source 240. Image source 240 is a device and/or service executing on a device communicatively coupled to user device 102 over a network (e.g., one or more local area networks (LANs), wide area networks (WANs), enterprise networks, the Internet, internal networks, etc.). The network may include one or more wired and/or wireless portions. Examples of image source 240 include, but are not limited to, an electronic device that provides content to user device 102 (e.g., a streaming media player, a computing device, a DVD player, a Blu-Ray player, etc.), a streaming service hosted on a server, image and/or video data stored in memory external to user device 102 (e.g., of a storage server, of an external storage device, of another computing device, etc.), and/or any other electronic device and/or service executing on an electronic device suitable for providing image and/or video data to user device 102.

Processor 208 may be a CPU, a GPU, and/or any other type of processor or processing unit configured for graphics- or display-related functionality. Some of the components of display system 104 may be integrated. For example, processor 208, memory 210, backlight controller 212, and/or display drivers 214 may be integrated as a system-on-a chip (SoC) or application-specific integrated circuit (ASIC). Display system 104 may include additional, fewer, or alternative components than those shown in FIG. 2. For example, display system 104 in accordance with an embodiment may not include a dedicated processor, and instead rely on processor 216. In accordance with another embodiment, display system 104 does not include memory 210, and instead uses memory 218 to support display-related processing. In embodiments, instructions implemented by, and data generated or used by, processor 208 are stored in memory 210, memory 218, or a combination of memory 210 and memory 218.

Display device 106 comprises backlight assembly 108 (as described with respect to FIG. 1) and LC display layer 206. LC display layer 206 is an example of display 110 of FIG. 1. LC display layer 206 includes an array 228 of pixels. As shown in FIG. 2, backlight assembly 108 comprises array layer 114 (comprising light sources 118 and reflective layer 120) and light sources 116, as described with respect to FIG. 1, and a waveguide layer 204. Waveguide layer 204 is an example of waveguide 112 of FIG. 1.

As described above (and elsewhere herein), light sources 116 are arranged along one or more edges of waveguide layer 204 and light sources 118 are arranged beneath waveguide layer 204 (e.g., between waveguide layer 204 and reflective layer 120 or between waveguide layer 204 and a supportive structure of backlight assembly 108). Light sources 116 and light sources 118 may be organic LED (OLED) devices, another type of LED, or another type of light source disposed along a display edge.

Light sources 116 are arranged in a column or row and are configured to transmit light 230 into waveguide layer 204 through the edge (or edges) they are arranged along. Each light source of light sources 116 is adjacent to a portion of waveguide layer 204 that corresponds to a row of a display area of display device 106. Each row includes a plurality of zones in series. Each row has at least one light source of light sources 116. In some cases, each row has multiple light sources. The option to include multiple light sources may provide flexibility in configuring the zone arrangement. Having multiple devices per zone may also provide redundancy and/or allow each constituent light source to share the average luminance level burden and, thus, be driven at a lower intensity. Operation at lower intensities may help avoid performance decay arising from overdriving the devices. In one example, the light sources are distributed in a column at 30 devices per inch, while backlight assembly 108 has only 10 rows per inch. Other device and zone/row resolutions may be used. Additional details regarding zones are described with respect to FIGS. 4B and 5, as well as elsewhere herein.

Light sources 118 are arranged in a matrix or array and are configured to transmit light 232 into waveguide layer 204 through a surface of waveguide layer 204. Each light source of light sources 118 is adjacent to a portion of waveguide layer 204 that corresponds to a zone of the display area of display device 106. Each zone of the display area is associated with at least one light source of light sources 118. In some cases, each zone has multiple light sources, which (in a similar manner as described with respect to light sources 116) provides flexibility in configuration of zones. In one example, light sources are distributed as two-by-two matrices to respective zones. Other device and zone/light source resolutions may be used. Additional details regarding zones are described with respect to FIGS. 4B and 5, as well as elsewhere herein.

Processor 208 is coupled to backlight assembly 108 to control the amount of light emitted by light sources 116 and/or light sources 118. In the example of FIG. 2, processor 208 is coupled to backlight assembly 108 via backlight controller 212. As also shown in FIG. 2, backlight controller 212 includes a string backlight driver 222 and an array backlight driver 224. String backlight driver 222 is configured to control the amount of light emitted by light sources 116. Array backlight driver 224 is configured to control the amount of light emitted by light sources 118. Processor 208 may execute code of string backlight driver 222 and/or code of array backlight driver 224, for example. Alternatively, backlight controller 212 is implemented in the form of hardware (e.g., electrical circuits including one or more processors, logic gates, and/or transistors) that may or may not execute one or both of firmware and software. String backlight driver 222 and/or array backlight driver 224 may include multiple respective drivers. Alternatively, string backlight driver 224 and array backlight driver 224 are integrated as a single driver.

String backlight driver 222 is configured to drive a light source of light sources 116 for each row of backlight assembly 108 (e.g., each row of waveguide layer 204, each row or group of rows of pixels of LC display layer 206, each row or group of rows of light sources 118) separately from other light sources in other rows. In embodiments where a row includes multiple light sources of light sources 116, each of the light sources in the respective row may be driven at a common brightness level. Alternatively or additionally, the multiple light sources may be driven at respective, individual brightness levels that together combine to establish a desired collective average luminance level for the row.

Array backlight driver 224 is configured to drive a light source of light sources 118 for each zone of the display area of display device 106 separately from other light sources in other zones. In embodiments where a zone includes multiple light sources of light sources 118, each of the light sources in the respective zone may be driven at a common brightness level. Alternatively or additionally, the multiple light sources may be driven at respective, individual brightness levels that together combine to establish a desired collective average luminance level for the zone.

Backlight assembly 108 in accordance with one or more embodiments is configured to transmit light 234 to LC display layer 206. Light 234 in accordance with one or more embodiments is white light (or near-white light). Each light source of light sources 116 and/or 118 in accordance with an embodiment are thus configured to emit white light. In an alternative embodiment, and as described further with respect to FIG. 8, light sources 116 and/or light sources 118 are color light sources (e.g., red, green, and/or blue colors). In this alternative, backlight assembly 108 includes a color conversion sheet that transforms (e.g., a portion of) the emitted light to white light (or another color of light) (e.g., by absorbing emitted light and reemitting the light as another color of light). In another alternative embodiment, light sources 116 and/or light sources 118 include arrangements of three color light sources (e.g., red, green, and blue colors). In such cases, the brightness of each color in a respective row (i.e., in the case of light sources 116) and/or zone (i.e., in the case of light sources 118) may be controlled separately from the colors in other rows and/or zones. The respective brightness levels of the colors may be determined as a function of the image to be displayed. In some cases, the brightness of each light source may depend on the intensities of the respective colors present in the image to be displayed.

As discussed with respect to FIG. 1 (as well as elsewhere herein), reflective layer 120 is configured to receive at least a portion of the light emitted by light sources 116 and away from LC display layer 206 and reflect the received portion of light toward LC display layer 206 (and away from layer 114). Reflective layer 120 in accordance with an embodiment (and as described further with respect to FIGS. 7, 8, and 9, as well as elsewhere herein) is arranged between light sources 118 and waveguide layer 204. In accordance with an alternative embodiment (and as described further with respect to FIGS. 6A, 6B, and 9, as well as elsewhere herein), light sources 118 are arranged between reflective layer 120 and waveguide layer 204. While only a single reflective layer 120 is shown in FIG. 2, in some embodiments, backlight assembly 108 includes multiple reflective layers (e.g., a reflective layer arranged between light sources 118 and waveguide layer 204 and another reflective layer arranged beneath light sources 118 (i.e., opposite of the first reflective layer)). Furthermore, while reflective layer 120 is shown in FIG. 2 as a sub-layer of array layer 114, it is also contemplated herein that reflective layer 120 may be a separate layer from array layer 114 (e.g., as a separate layer of backlight assembly 108, as a base layer of display device 106 (e.g., wherein backlight assembly 108 is arranged between the base layer and LC display layer 206), or as a sub-layer of waveguide layer 204).

LC display layer 206 is disposed adjacent or proximate to backlight assembly 108. One or more intervening layers may be present. In some cases, backlight assembly 108 and LC display layer 206 are in contact with each other. Alternatively, one or more transparent layers are disposed between backlight assembly 108 and LC display layer 206. For example, an adhesive film may be disposed between backlight assembly 108 and LC display layer 206. A diffusing or other layer or element may nonetheless be disposed between backlight assembly 108 and LC display layer 206 in some cases.

LC display layer 206 is configured to selectively filter light 234 generated by the plurality of light sources to produce filtered light 236. LC display layer 206 may include one or more layers arranged in a liquid crystal panel. For example, respective layers may be provided in the liquid crystal panel for separate color filtering. The liquid crystal panel (or a layer thereof) defines an array 228 of pixels addressable by processor 208 (and/or display drivers 214). The number of pixels in array 228 may outnumber the resolution of the zone arrangement in backlight assembly 108. The resolution of array 228 shown in FIG. 2 and the resolution(s) of zone(s) in backlight assemblies described herein (with respect to FIG. 2 or otherwise) are merely exemplary and provide for case in illustration. For example, array 324 may have a resolution one, two, or more orders of magnitude higher than the resolution of zones of backlight assembly 108.

Processor 208 in accordance with an embodiment individually controls each pixel in array 228 to determine the extent to which light from light sources 116 and/or 118 passes through LC display layer 206. In this example, processor 208 is configured to execute code of LC controller 226 and/or display drivers 214 to control LC display layer 206. Alternatively, display drivers 214 are implemented in the form of hardware (e.g., electrical circuits including one or more processors, logic gates, and/or transistors) that may or may not execute one or both of firmware and software. Processor 208 and/or display drivers 214 may be configured to adjust the image tone levels for array 228 of LC display layer 206 to coordinate the filtering of the light with the brightness levels of the light sources. For example, the amount of filtering may be adjusted along a boundary between adjacent zones of backlight assembly 108 with different brightness levels (e.g., different average luminance levels for different zones). If the pixels on either side of the boundary are intended to have similar image tone levels, the pixels in the zone with the brighter backlighting are directed to filter more light relative to pixels in another zone with a dimmer backlighting. The filtering of a respective pixel of LC display layer 206 may thus be controlled in a manner that takes into account the amount of light emitted by the light sources 116 and/or 118 in which the pixel is disposed. The average luminance level of backlight assembly 108 and the amount of filtering are thus two controllable variables that combine to achieve a desired tone or brightness for each pixel.

Processor 208 and/or backlight controller 212 process image data 246 to determine an average luminance level of a display area of display device 106. In some cases, image data 246 is processed separately for a subset of a display area of LC display layer 206 from the image data for other subsets of the display area. The average luminance level for portions of the display area may be determined on a zone-by-zone basis, a row-by-row basis, and/or in any other grouping of zones and/or other subsets of the display area.

In some embodiments, processor 208 and/or backlight controller 212 performs additional processing on image data 246 (e.g., before or after determining an average luminance level of the display area). For example, processor 208 and/or backlight controller 212 in accordance with an embodiment includes a low pass filter (LPF) configured to smooth the brightness levels of nearby zones and/or rows. As a result of the smoothing, differences between the brightness levels in adjacent rows may be limited to a predetermined amount. Artifacts or irregularities in the resulting displayed images may thus be avoided or reduced. The low pass filter may be implemented in hardware, software, firmware, or a combination thereof.

Ambient light sensor 238 is configured to detect ambient light of the room or location user device 102 is located in and transmit ambient light data 250 to processor 208. As shown in FIG. 2, ambient light sensor 238 is integrated in display system 104. Alternatively, ambient light sensor 238 may be a separate component of user device 102, a standalone ambient light sensor external to user device 102, or integrated in a device communicatively coupled to user device 102. As described elsewhere herein, processor 208 and/or backlight controller 212 in accordance with some embodiments controls light sources 116 and/or light sources 118 based on ambient light data 250 received from ambient light sensor 238.

Figure 3:
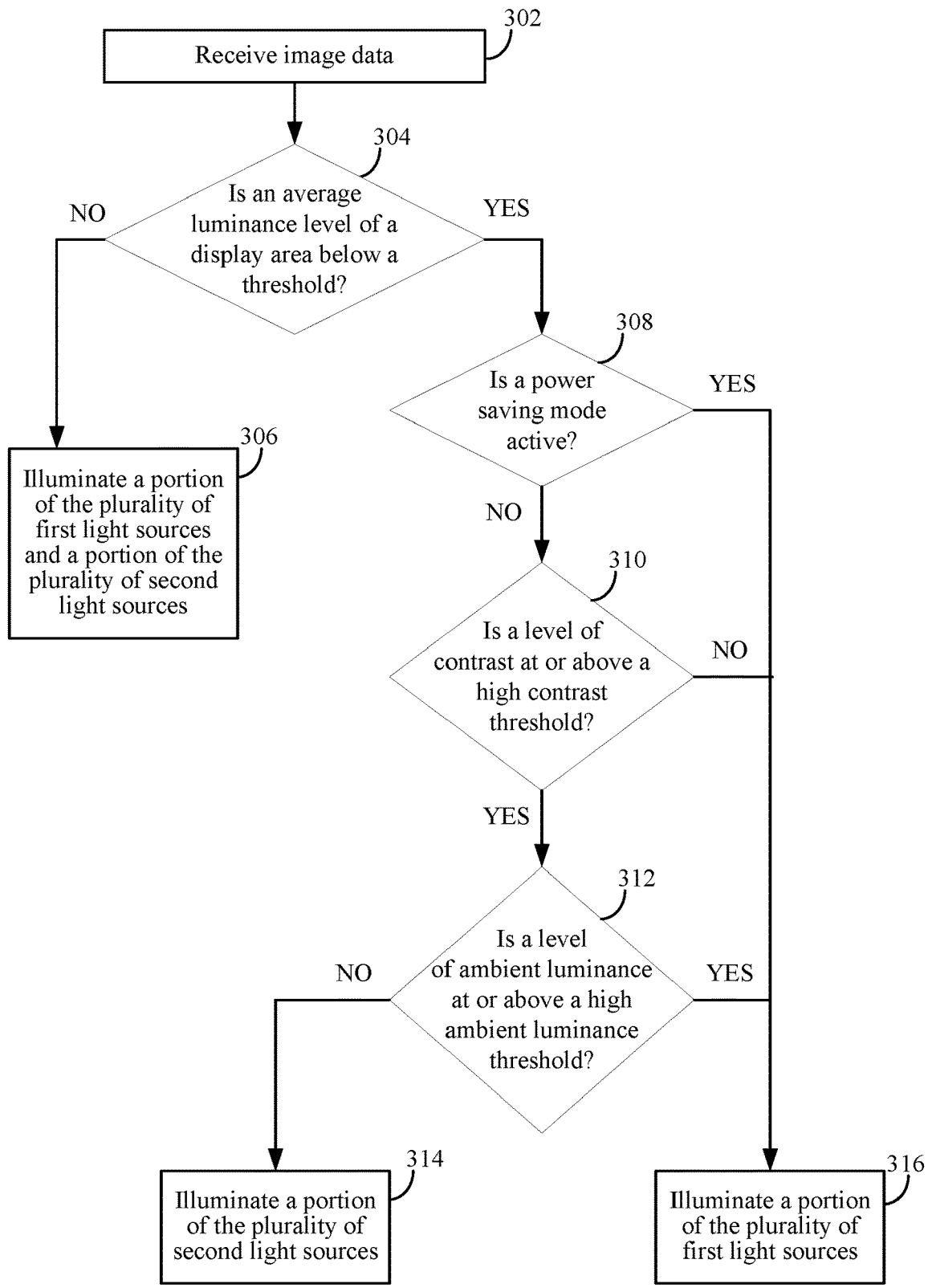
FIG. 3 shows a flowchart of a process for illuminating a portion of light sources of a compound backlight, according to an example embodiment.

In some embodiments, and as described further with respect to FIG. 3 (as well as elsewhere herein), user device 102 operates in multiple power modes. For instance, in accordance with an embodiment user device 102 operates in a power saving mode and a regular power mode. If user device 102 is operating in power saving mode, processor 216 transmits a notification 248 to processor 208 indicating the power saving mode is active. As described elsewhere herein, processor 208 and/or backlight controller 212 in accordance with some embodiments controls light sources 116 and/or light sources 118 based on whether or not the power saving mode is active. While power saving mode and regular power mode are described herein, user device 102 may operate in other types of power modes, including, but not limited to a performance mode (e.g., a high dynamic range (HDR) mode), an ultra-power saving mode, and/or the like.

Accordingly, example embodiments of processors (e.g., processor 208) and backlight controllers (e.g., backlight controller 212) are configured to control light sources 116 associated with a row (e.g., by applying a voltage to, or removing a voltage from, electrodes associated with the row) and/or light sources 118 associated with a zone (e.g., by applying a voltage to, or removing a voltage from, electrodes associated with the zone).

Embodiments of backlight controllers (or processors executing code of a backlight controller) may operate in various ways to illuminate a portion of light sources of the backlight. For instance, FIG. 3 shows a flowchart 300 of a process for illuminating a portion of light sources of a compound backlight, according to an example embodiment. Backlight controller 212 of FIG. 2 may operate according to flowchart 300, in an embodiment. Note that not all steps of flowchart 300 need be performed in all embodiments. Further structural and operational embodiments will be apparent to persons skilled in the relevant art(s) based on the following description of FIG. 3 with respect to FIG. 2.

Flowchart 300 begins with step 302. In step 302, image data is received. For example, processor 208 of FIG. 2 receives image data 246. In some cases, image data 246 comprises image data for the entire display area of LC display layer 206. Alternatively, image data 246 comprises image data for a subset of the display area (e.g., a zone, a plurality of zones, a row of zones, a plurality of rows of zones, etc.). Image data 246 may correspond to image data generated by processor 216, image data generated by another component of user device 102, image data 242 stored in memory 218, image data 244 received from image source 240, and/or the like.

In step 304, a determination of whether an average luminance level of a display area is below a threshold is made. For example, backlight controller 212 (or processor 208 executing code of backlight controller 212) of FIG. 2 determines whether an average luminance level of a display area is below a threshold based on image data 246. In accordance with an embodiment, backlight controller 212 makes the determination based also on ambient light data 250. Image data 246 may be processed for the entire display area of LC display layer 206 or a subset of the display area. For instance, the average luminance level of the display area may be determined for each zone, each group of zones, each row of zones, each plurality of rows of zones, and/or any other grouping of zones or other subset of the display area of LC display layer 206. In this way, an average luminance level for that subset of the display area is determined based on image data local to the subset, rather than global image data for the entire display area. In addition to determining average luminance level (for an entire display area and/or one or more subsets of the display area), backlight controller 212 may also determine, based on image data 246) an image histogram, an image contrast level, and/or any other information that may be used to control light sources 116 and/or light sources 118. If the average luminance level of the display area is not below the threshold, flowchart 300 proceeds to step 306. If the average luminance level of the display area is below the threshold, flowchart 300 proceeds to step 308.

In step 306, a portion of the plurality of first light sources and a portion of the plurality of second light sources are illuminated. For example, backlight controller 212 (or processor 208 executing code of backlight controller 212) of FIG. 2 illuminates a portion of light sources 116 and a portion of light sources 118 corresponding to the analyzed image data of image data 246. For instance, if in step 304 backlight controller 212 analyzes image data of the entire display area and determines an average luminance level of the display area is above the threshold, backlight controller 212 in accordance with an embodiment illuminates all of light sources 116 and light sources 118. If in step 304 backlight controller 212 analyzes image data corresponding to a particular row or zone, backlight controller 212 in accordance with an embodiment illuminates light sources of light sources 116 and light sources 118 that correspond to that particular row or zone. Additional details regarding zones, rows, and controlling subsets of light sources corresponding to zones and rows are discussed with respect to FIGS. 4B and 5, as well as elsewhere herein. By illuminating both edge lights (light sources of light sources 116) and array lights (light sources of light sources 118), backlight assembly 108 is able to emit light at a higher luminance level than if only array lights or edge lights were illuminated, thereby improving the quality of content displayed by the zone or row illuminated by the array lights and edge lights.

In step 308, a determination of whether or not a power saving mode is active is made. For example, backlight controller 212 (or processor 208 executing code of backlight controller 212) of FIG. 2 determines whether or not a power saving mode is active. In accordance with an embodiment, backlight controller 212 determines whether the power saving mode is active based on whether or not a notification 248 is received from processor 216 indicating the power saving mode is active. In accordance with an embodiment, a user interacts with a user interface of user device 102 or a remote control device of user device 102 (not shown in FIG. 2) to activate (or deactivate) power saving mode. In accordance with another embodiment, user device 102 (or a component or application of user device 102) automatically activates power saving mode if a particular condition is met (e.g., a charge level of a battery of user device 102 is below a threshold). If the power saving mode is not active, flowchart 300 proceeds to step 310. If the power saving mode is active, flowchart 300 proceeds to step 316.

In step 310, a determination of whether a level of contrast is at or above a high contrast threshold is made. For example, backlight controller 212 (or a processor 208 executing code of backlight controller 212) of FIG. 2 determines whether a level of contrast is at or above a high contrast threshold. Backlight controller 212 determines the level of contrast of an image to be displayed by display device 106 based on image data 246. In accordance with another embodiment, backlight controller 212 determines the level of contrast for a particular zone or row of display device 106. If the level of contrast is at or above the high contrast threshold, flowchart 300 proceeds to step 312. Otherwise, flowchart 300 proceeds to step 316.

Step 310 is described with respect to determining whether a level of contrast is at or above a high contrast threshold.

In an alternative embodiment, backlight controller 212 is configured to determine whether a level of contrast is at or below a low contrast threshold.

In step 312, a determination of whether a level of ambient luminance is at or above a high ambient luminance threshold is made. For example, backlight controller 212 (or a processor 208 executing code of backlight controller 212) of FIG. 2 determines whether a level of ambient luminance is at or above a high ambient luminance threshold based on ambient light data 250. If the level of ambient luminance is not at or above the high luminance threshold, flowchart 300 proceeds to step 314. If the level of ambient luminance is at or above the high luminance threshold, flowchart 300 proceeds to step 316.

Step 312 is described with respect to determining whether a level of ambient luminance is at or above a high ambient luminance threshold. In an alternative embodiment, backlight controller 212 is configured to determine whether a level of ambient luminance is at or below a low ambient luminance threshold.

In step 314, a portion of the plurality of second light sources are illuminated. For example, array backlight driver 224 (or processor 208 executing code of array backlight driver 224) of FIG. 2 illuminates a portion of light sources 118 corresponding to the analyzed image data of image data 246. For instance, if in step 304 backlight controller 212 analyzes image data of the entire display area, array backlight driver 224 in accordance with an embodiment illuminates all of light sources 118. If in step 304 backlight controller 212 analyzes image data corresponding to a particular row or zone, array backlight driver 224 in accordance with an embodiment illuminates light sources of light sources 118 that correspond to that particular row or zone. Additional details regarding zones, rows, and controlling subsets of light sources corresponding to zones and rows are discussed with respect to FIGS. 4B and 5, as well as elsewhere herein.

In step 316, a portion of the plurality of first light sources are illuminated. For example, string backlight driver 222 (or processor 208 executing code of string backlight driver 222) of FIG. 2 illuminates a portion of light sources 116 corresponding to the analyzed image data of image data 246. For instance, if in step 304 backlight controller 212 analyzes image data of the entire display area, string backlight driver 222 in accordance with an embodiment illuminates all of light sources 116. If in step 304 backlight controller 212 analyzes image data corresponding to a particular row or zone, string backlight driver 222 in accordance with an embodiment illuminates light sources of light sources 116 that correspond to that particular row or zone. Additional details regarding zones, rows, and controlling subsets of light sources corresponding to zones and rows are discussed with respect to FIGS. 4B and 5, as well as elsewhere herein.

In step 316, backlight controller 212 may also disable (or otherwise not use) drivers of array backlight driver 224 that control light sources of light sources 118 corresponding to the particular zone or row the illuminated light sources of light sources 116 correspond to. For instance, if the entire display area is analyzed and all of light sources 116, backlight controller 212 disables array backlight driver 224. If light sources of light sources 116 are illuminated for a particular zone or row, backlight controller 212 disables the driver that controls light sources of light sources 118 corresponding to (at least a portion of) the particular zone or row. By selectively disabling drivers of array backlight driver 224 in this manner, backlight controller 212 reduces power consumed by display device 106, as fewer light sources are powered to light (e.g., a portion of or all of) the display area.

III. Example Backlight Assembly Embodiments with Edge and Array Light Sources

Figure 4A:
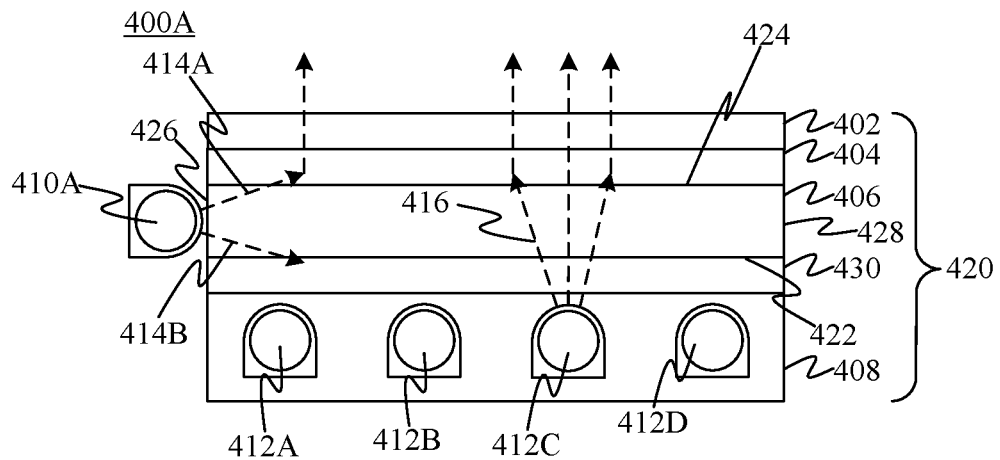
FIG. 4A shows a cross-sectional side view of a backlight assembly that includes edge light sources and array light sources, according to an example embodiment.
Figure 4B:
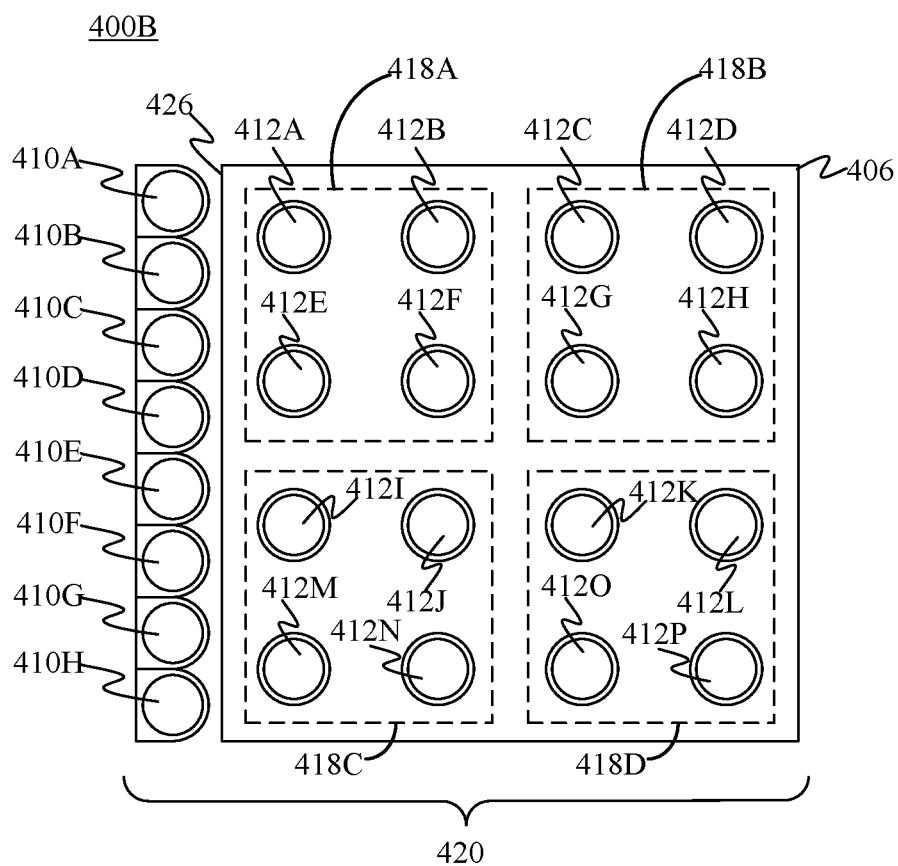
FIG. 4B shows a top view of the backlight assembly of FIG. 4A, according to an example embodiment.

As described herein, a (e.g., compound) backlight assembly such as backlight assembly 108 of FIGS. 1 and 2 includes edge and array light sources. Backlight assembly 108, light sources 116 (edge lights), and light sources 118 (array lights) may be configured in various ways to perform their functions, in embodiments. For instance, FIG. 4A shows a cross-sectional side view 400A of a backlight assembly 420 that includes edge light sources and array light sources, according to an example embodiment. FIG. 4B shows a top view 400B of backlight assembly 420 of FIG. 4A, according to an example embodiment. Backlight assembly 420 is an example of backlight assembly 108, described with respect to FIGS. 1 and 2. Further structural and operational embodiments will be apparent to persons skilled in the relevant art(s) based on the following description of FIGS. 4A and 4B.

As shown in FIGS. 4A and 4B, backlight assembly 420 comprises a diffusion layer 402, one or more prism sheets 404 ("prism sheet 404" herein), a waveguide layer 406, one or more pyramid sheets 430 ("pyramid sheets 430" herein), an array layer 408, and light sources 410A-410H. Array layer 408 comprises light sources 410A-410P. Pyramid sheets 430 are configured to scatter light emitted by array layer 408. In accordance with an embodiment, pyramid sheets 430 are polymer sheets with pyramids (or other shape suitable for spreading light) stamped into them. Diffusion layer 402 and prism sheets 404 are configured to normally distribute light transmitted through waveguide layer 406.

Waveguide layer 406 is a further example of waveguide 112 of FIG. 1 and waveguide layer 204 of FIG. 2. Waveguide layer 406 is transparent, has opposing first and second surfaces 422 and 424 and opposing first and second edges 426 and 428. For surfaces 422 and 424 and edges 426 and 428, there can be small tilt angles (angles other than zero) between them for performances and uniformities. Waveguide layer 406 may be made of any suitable material, including a transparent polymer, glass, a fiber optic material, etc. Waveguide layer 406 is configured to guide transversal (or near transversal) light (e.g., light emitted by light sources 412A-412P) and to spread and guide orthogonal (or near orthogonal) light (e.g., light emitted by light sources 410A-410H). This particular design for waveguide layer 406 enables the use of the same layer to facilitate illumination of zones of backlight assembly 850 by edge lights (light sources 410A-410H) and array lights (light sources 412A-412P). Thus, the structure of backlight assembly 850 can be relatively thinner than an assembly using separate waveguides for light emitted by light sources 410A-410H and light emitted by light sources 412A-412P.

Light sources 410A-410H ("light sources 410" collectively) are examples of light sources 116 of FIGS. 1 and 2. Although five individual light sources are included in light sources 410 in the example of FIG. 4B, any number of light sources may be present, including tens, hundreds, or even greater numbers of light sources, etc. Each of light sources 410 is configured to transmit light into waveguide layer 406 through edge 426.

Light sources 412A-412P ("light sources 412" collectively) are examples of light sources 118 of FIGS. 1 and 2. Although sixteen individual light sources are included in light sources 412 in the example of FIG. 4B, any number of light sources may be present, including tens, hundreds, or even greater numbers of light sources, etc. Each of light sources 412 is configured to transmit light into waveguide layer 406 through surface 422.

Layers of diffusion layer 402, prim sheet 404, waveguide layer 406, pyramid sheets 430, and/or array layer 408 may be attached in any manner such that adjacent layers are flat (or nearly flat) against each other. For instance, the layers may be attached by an adhesive material (e.g., an epoxy, a thin film adhesive, etc.), by lamination, by fabricating a layer onto a surface of another layer (e.g., fabricating prim sheet 404 onto surface 424 of waveguide layer 406), or in another manner.

As shown in FIG. 4B, backlight array 420 has a plurality of zones 418A-418D. Zones 418A-418D may be arranged in a matrix or array as shown in FIG. 4B. In this example, zones 418-418D are arranged in two contiguous rows and two contiguous columns. The rows and columns may or may not be oriented along the vertical and horizontal axes of the viewable area. In some cases, the size, shape, and other aspects of zones 418A-418D may vary across the viewable area. While each of zones 418A-418D are shown in FIG. 4B as including four light sources, embodiments described herein are not so limited. For instance, in some embodiments, zones may include fewer (e.g., 1, 2, or 3) light sources, the same number of light sources, and/or more (e.g., tens, hundreds, etc.) light sources. In some embodiments, one or more zones include a different number of light sources than another light source. Furthermore, while zones 418A-418D are arranged in square matrices, embodiments described herein may be arranged in other shapes as well.

As shown in FIG. 4B, light sources of light sources 410 are arranged such that a respective subset of light sources 410 are associated with a respective subset of zones 418A-418D. For instance, light sources 410A-410D are associated with zones 418A and 418B and light sources 410E-410H are associated with zones 418C and 418D. In this context, zones 418A and 418B comprise a first row of zones and zones 418C and 418D comprise a second row of zones. While each row shown in FIG. 4B includes two zones, embodiments of rows described herein may include fewer (e.g., 1 zone) or greater (e.g., tens, hundreds, etc.) numbers of zones.

FIG. 4A illustrates how light is passed from backlight assembly 420. For instance, suppose light source 410A and light source 412C are in an "on" state (i.e., light sources 410A and 412C are illuminated). With respect to light source 410A, light source 410A emits light (represented as light 414A and light 414B), which enters (i.e., is transmitted into) waveguide layer 406 at edge 426. A portion of light emitted by light source 410A (represented as light 414A) passes through surface 424, prism sheets 404, and diffusion layer 402 as extracted light. The extracted light is received by the LC display layer (not shown in FIG. 4A for brevity). Some of the light emitted by light source 410A (e.g., light 414B) is directed away from surface 424 of waveguide layer 428. In some cases, light 414B is considered "lost light." However, in other cases, backlight assembly 420 is configured to recapture at least a portion of lost light and direct the recaptured light through waveguide layer 428, prism sheet 404, and diffusion layer 402 as extracted recaptured light. Embodiments of backlight assemblies configured to recapture light are discussed further with respect to FIGS. 6A-9, as well as elsewhere herein.

With respect to light source 412C, light source 412C emits light (represented as light 416), which passes through pyramid sheets 430 (which further scatters light 416) and enters (i.e., is transmitted into) waveguide layer 406 at surface 422. Light 416 passes through surface 424, prism sheet 404, and diffusion layer 402 as extracted light. The extracted light is received by the LC display layer (not shown in FIG. 4A for brevity).

In some embodiments, a backlight controller (e.g., backlight controller 212 of FIG. 2) is configured to selectively illuminate zones 418A-418D of backlight assembly 420. Backlight controller 212 may operate in various ways to selectively illuminate zones 418A-418D of backlight assembly 420, in embodiments. For instance, FIG. 5 shows a flowchart 500 of a process for illuminating a portion of light sources of a compound backlight, according to an example embodiment. Backlight controller 212 may operate according to flowchart 500, in an embodiment. Note that not all steps of flowchart 500 need be performed in all embodiments. Further structural and operational embodiments will be apparent to persons skilled in the relevant art(s) based on the following description of FIG. 5 with respect to FIGS. 2 and 4B.

Flowchart 500 begins with step 502. In step 502, an average luminance level of a first zone of a display area is determined to be below a threshold based on image data and an average luminance level of a second zone of the display area is determined to be above the threshold based on the image data. For instance, as a non-limiting running example, suppose backlight controller 212 of FIG. 2 determines an average luminance level of zone 418A of FIG. 4 is below a threshold based on image data 246 and an average luminance level of zone 418C is above the threshold based on image data 246. Backlight controller 212 may determine the average luminance levels of the zones in a similar manner described with respect to step 304 of flowchart 300.

In step 504, a portion of a plurality of first light sources corresponding to the first zone is illuminated. Referring again to the running example described with respect to step 502, backlight controller 212 of FIG. 2 illuminates light sources 410A-410D (i.e., edge light sources corresponding to zone 418A). In accordance with an embodiment, backlight controller 212 illuminates all of the light sources (e.g., light sources 410A-410D) corresponding to zone 418A. In an alternative embodiment, backlight controller 212 illuminates a portion of the light sources (e.g., one, two, or three of light sources 410A-410D) corresponding to zone 418A. By illuminating edge light sources corresponding to zones with average luminance below a threshold in this manner, embodiments of the present disclosure can reduce power consumed by backlight assembly 420 compared to using array light sources to illuminate the same zone. Furthermore, in some embodiments, backlight controller 212 disables the driver of array lights associated with zone 418A (e.g., light sources 412A, 412B, 412E, and 412F). By selectively disabling drivers of array lights associated with a zone with an average luminance level below a threshold in this way, the power consumed by backlight assembly 420 is further reduced.

In step 506, a portion of a plurality of second light sources corresponding to the second zone is illuminated. Referring again to the running example described with respect to steps 502 and 504, backlight controller 212 of FIG. 2 illuminates light sources 412I. 412J. 412M, and 412N (i.e., array light sources corresponding to zone 418C). In accordance with an embodiment, backlight controller 212 illuminates all of the light sources (e.g., light sources 412I, 412J, 412M, and 412N) corresponding to zone 418C. In an alternative embodiment, backlight controller 212 illuminates a portion of the light sources (e.g., one, two, or three of light sources 412I, 412J, 412M, and 412N) corresponding to zone 418C. By determining to illuminate array light source subsequent to having determined an average luminance level of zone 418C is above a threshold in this way, backlight controller 212 (e.g., only) enables drivers of array lights of the appropriate zone in a manner that improves the power efficiency of backlight assembly 420 (e.g., because drivers that are not needed are not powered). In accordance with an embodiment, backlight controller 212 illuminates one or more edge light sources (e.g., one or more of light sources 410E-410H) corresponding to zone 418C. In this manner, backlight assembly 108 is able to emit light from zone 418C at a higher average luminance level than if only array light sources 412I, 412J, 412M, and 412N were illuminated. Alternatively, by utilizing edge light sources in conjunction with array light sources for a zone with a high average luminance level, the number of array light sources within the zone may be reduced, thereby decreasing manufacturing cost of the backlight assembly. In another alternative, by utilizing edge light sources in conjunction with array light sources for a zone with a high average luminance level, the amount of current driven to the array light sources within the zone may be reduced, thereby improving the power efficiency of the device.

Flowchart 500 has been described with respect to backlight controller 212 selectively illuminating edge light sources (e.g., one or more of light sources 410A-410H) and/or array light sources (e.g., one or more of light sources 412A-412P) based on average luminance levels of respective zones. It is also contemplated herein that backlight controller 212 may selectively illuminate edge and/or array light sources based on other factors as well. For instance, backlight controller 212 in accordance with an embodiment illuminates (e.g., only) edge light sources for zones with low contrast (e.g., a level of contrast below a high contrast threshold and/or level of contrast at or below a low contrast threshold) and illuminates (e.g., only) array light sources (or array lights and edge lights) for zones with high contrast (e.g., a level of contrast at or above a high contrast threshold (e.g., as described with respect to step 310 of flowchart 300 of FIG. 3)). Furthermore, backlight controller 212 in accordance with another embodiment compares the contrast level between two zones when determining whether to use edge light sources, array light sources, or a combination of array and edge light sources. By selectively illuminating edge and/or array lights for particular zones based on levels of contrast, display device 106 is able to achieve a high contrast ratio between zones illuminated with edge lights (and not array lights) and zones illuminated with array lights (or array and edge lights), thereby improving the quality of the image displayed by display device 106.

Furthermore, in some embodiments, backlight controller 212 is configured to illuminate edge light sources and array light sources for a particular zone. For instance, in step 506 of flowchart 500, backlight controller 212 may illuminate both edge lights and array lights that correspond to the second zone. Alternatively, backlight controller 212 illuminates both edge lights and array lights if an average luminance level of a zone is above a second (e.g., higher) threshold. In accordance with another embodiment, backlight controller 212 illuminates both edge lights and array lights for zones where an image has a flat field (e.g., a monochrome area). By illuminating both edge lights and array lights for a zone with a flat field, display device 106 improves the uniformity of the displayed image. Further still, if edge lights and array lights are illuminated for flat field areas, the number of light sources in the array can be reduced.

Embodiments are described in further detail as follows. The next subsection describes backlight assemblies with reflective layers, followed by a subsection describing backlight assemblies with reflective layers located in between the waveguide layer and the array layer, followed by a subsection describing backlight assemblies with multiple reflective layers.

A. Example Backlight Assembly Embodiments with a Reflective Layer

Display device 106 (including backlight assembly 108 and display 110) may be configured in various ways to perform its functions, in embodiments. For instance, as discussed elsewhere herein, backlight assembly 108 may include one or more reflective layers (e.g., reflective layer 120 of FIG. 1). The reflective layer of backlight assembly 108 may be configured in various ways, in embodiments. For example, FIG. 6A shows a cross-sectional view 600A of a display layer and a backlight assembly that includes edge light sources and array light sources, according to an example embodiment. As shown in FIG. 6A, cross-sectional view 600A includes a display layer 602 and a backlight assembly 650A, each of which are respective further examples of display 110 and backlight assembly 108, as described with respect to FIG. 1. In accordance with an embodiment, display layer 602 and backlight assembly 650A are attached in a manner such that display layer 602 is flat (or nearly flat) against backlight assembly 650A. For instance, display layer 602 may be attached to backlight assembly 650A by an adhesive material, by lamination, by fabricating a layer onto a surface of another layer (e.g., by fabricating display layer 602 onto a layer of backlight assembly 650A), or in another manner.

Backlight assembly 650A includes a diffusion layer 604, one or more prism sheets 606 ("prism sheets 606" herein), a waveguide layer 608, one or more pyramid sheets 610 ("pyramid sheets 610" herein), an array layer 632, and a light source 616A, each of which are respective examples of diffusion layer 402, prism sheets 404, waveguide layer 406, pyramid sheets 430, array layer 408, and light source 410A, as each described with respect to FIGS. 4A and 4B. Waveguide layer 608 has opposing first and second surfaces 634 and 636 and opposing first and second edges 638 and 640.

As shown in FIG. 6A, array layer 632 comprises a light source layer 612 (comprising light sources 618A-618C) and a reflective layer 614. In accordance with an embodiment, light source layer 612 includes an optically clear (e.g., transparent) resin, film, or other material that surrounds light sources 618A-618C. Light sources 618A-618C are examples of light sources 412A-412P, as described with respect to FIGS. 4A and 4B.

Reflective layer 614 is a further example of reflective layer 120 (as described with respect to FIG. 1) and is arranged beneath light sources 618A-618C (such that light sources 618A-618C are arranged between reflective layer 614 and waveguide layer 608). Reflective layer 614 may be a specular reflective surface, a diffused reflective surface, or another type of reflective surface. Reflective layer 614 is configured to reflect light transmitted by light source 616A (and other edge light sources of backlight assembly 650A, not shown in FIG. 6A) into (or toward) waveguide layer 608 through surface 634 of waveguide layer 608.

With respect to reflective layer 614, FIG. 6A illustrates how light is passed from backlight assembly 650A to display layer 602. For instance, suppose light sources 616A and 618C are in an "on" state (i.e., light sources 616A and 618C are illuminated). With respect to light source 616A, light source 616A emits light (represented as light 620A and 620B), which enters (i.e., is transmitted into) waveguide layer 608 at edge 638. A portion of light emitted by light source 616A (represented as light 620A) passes through surface 636, prism sheets 606, and diffusion layer 604 as extracted light 652. Extracted light 652 is received by display layer 602.

Some of the light emitted by light source 616A (represented as light 620B) is directed away from surface 636 of waveguide layer 608. Backlight assembly 650A is configured to recapture at least a portion of light 620B. For instance, as shown in FIG. 6A, light 620B passes through surface 634, pyramid sheets 610, and light source layer 612. Reflective surface 614 is configured to reflect light 620B as reflected light 622. Reflected light 622 passes through light source layer 612, through pyramid sheets 610, and into waveguide layer 608 via surface 634. Reflected light 622 passes through surface 636, prism sheets 606, and diffusion layer 604 as extracted light 654. Extracted light 654 is received by display layer 602. By configuring reflective surface 614 in this manner, backlight assembly 650A is able to recapture light emitted by light source 616A that would otherwise be lost, thereby increasing the light output by backlight assembly 650A when utilizing edge lights (e.g., light source 616A).

With respect to light source 618C, light emitted by light source 618C passes through backlight assembly 650A in a similar manner to light emitted by light source 412C passing through backlight assembly 420, as described with respect to FIG. 4A. Light source 618C emits light (represented as light 624), which passes through pyramid sheets 610 (which further scatters light 624) and enters (i.e., is transmitted into) waveguide layer 608 at surface 634. Light 624 passes through surface 636, prism sheets 606, and diffusion layer 604 as extracted light 656. Extracted light 656 is received by display layer 602.

Figure 6B:
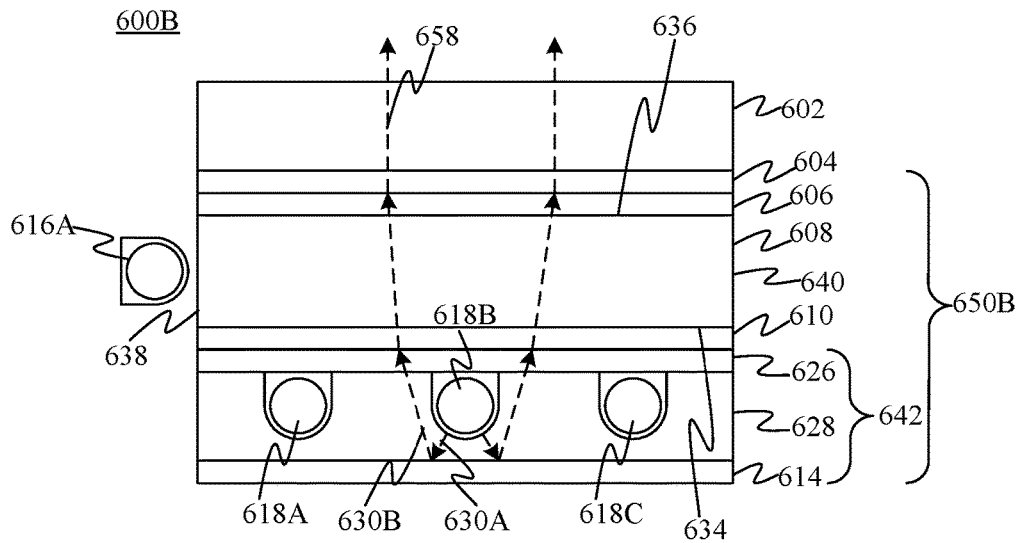
FIG. 6B shows a cross-sectional view of a display layer and a backlight assembly that includes edge light sources and array light sources, according to another example embodiment.

An example embodiment of a backlight assembly with array light sources arranged between a waveguide layer and a reflective layer has been described with respect to cross-sectional view 600A of FIG. 6A. In a further embodiment, backlight assembly 108 is configured with array light sources oriented away from the waveguide layer. For example, FIG. 6B shows a cross-sectional view 600B of a display layer and a backlight assembly that includes edge light sources and array light sources, according to another example embodiment. As shown in FIG. 6B, cross-sectional view 600B includes display layer 602 as described with respect to FIG. 6A and a backlight assembly 650B. Backlight assembly 650B is a further example of backlight assembly 108 described with respect to FIG. 1. In accordance with an embodiment, backlight assembly 650B is attached to display layer 602 in any of the manners described with respect to display layer 602 and backlight assembly 650A of FIG. 6A.

Backlight assembly 650B includes a diffusion layer 604, prism sheets 606, waveguide layer 608, pyramid sheets 610, and light source 616A, as described with respect to FIG. 6A, and an array layer 642. Array layer 642 comprises a transparent sublayer 626, light source layer 628 (comprising light sources 618A-618C), and reflective layer 614 (as described with respect to FIG. 6A). In accordance with an embodiment, light source layer 628 includes an optically clear resin, film, or other material that surrounds light sources 618A-618C. Transparent sublayer 626 in accordance with an embodiment is an optically clear flexible printed circuit board to which light sources 618A-618C are mounted.

As shown in FIG. 6B, light sources 618A-618C are mounted to transparent sublayer 626 and oriented toward reflective layer 614 and away from surface 634 of waveguide layer 608. To illustrate the operation of light sources 618A-618C with respect to array layer 642, FIG. 6B includes representations of light emitted by light source 618B. In this example, light source 618B is in an "on" state (i.e., illuminated) and emits light (represented as light 630A). Light source 618B transmits light 630A toward reflective layer 614 to cause reflective layer 614 to reflect light 630A into (pyramid sheets 610 and) waveguide layer 608 through surface 634 as reflected light 630B. Reflected light 630B passes through surface 636, prism sheets 606, and diffusion layer 604 as extracted light 658. Extracted light 658 is received by display layer 602. By orienting light sources 618A-618C to transmit light toward reflective layer 614 in this manner, backlight assembly 650B reduces or eliminates the presence of "hot spots" (e.g., areas where light emitted by light sources 618A-618C are less effectively diffused through a backlight assembly (e.g., directly above an array light source)). Thus, backlight assembly 650B improves the uniformity of extracted light received by display layer 602. Furthermore, the reflection of light 630A as reflected light 630B causes scattering of light emitted by light source 618B; therefore, in some embodiments of backlight 650B, the number of pyramid sheets in pyramid sheets 610 may be reduced compared to designs where light sources 618A-618C are oriented toward waveguide layer 608 (e.g., as in backlight 650A). This allows for a thinner backlight assembly while still sufficiently scattering light emitted by light sources 618A-618C.

Figure 7:
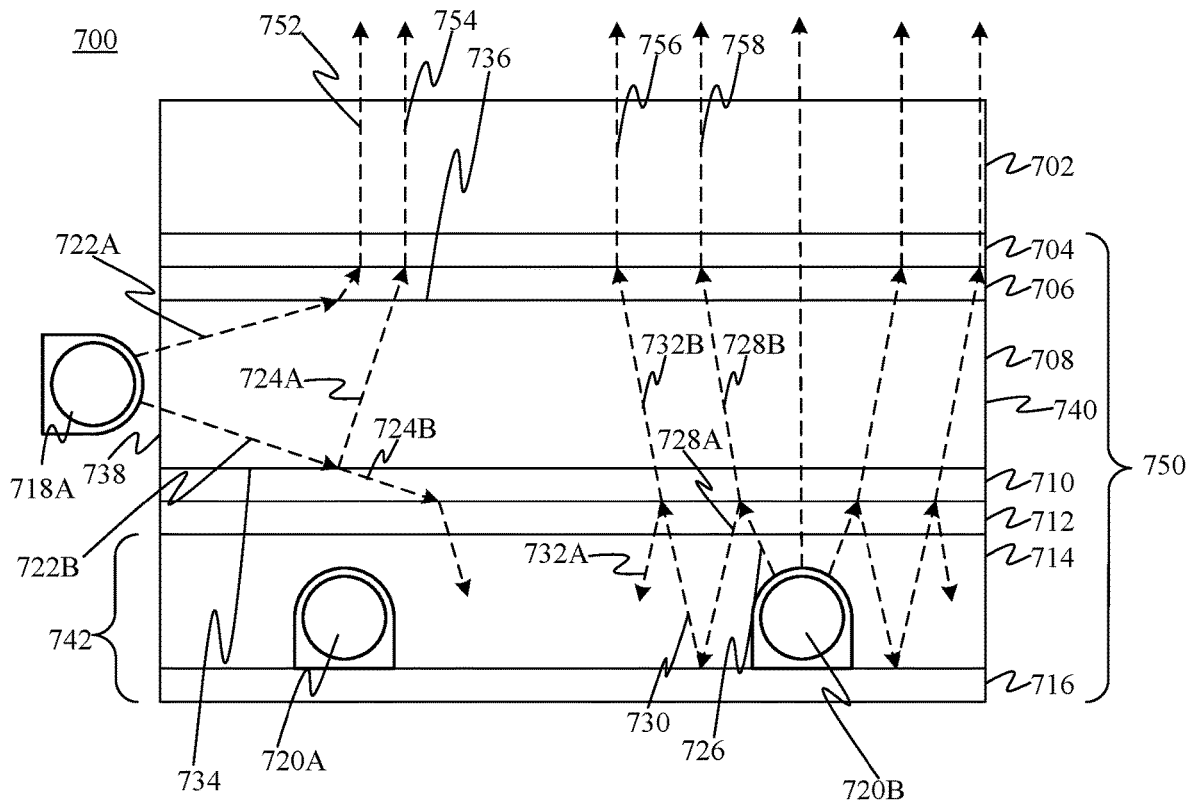
FIG. 7 shows a cross-sectional view of a display layer and a backlight assembly that includes edge light sources and array light sources, according to another example embodiment.

B. Example Backlight Assembly Embodiments with a Reflective Layer Located in Between the Waveguide Layer and the Array Layer In some embodiments of backlight assembly 108, reflective layer 120 is arranged between the waveguide layer and the array layer. Backlight assemblies with reflective layers arranged between a waveguide layer and an array layer may be configured in various ways, in embodiments. For instance, FIG. 7 shows a cross-sectional view 700 of a backlight assembly that includes edge light sources and array light sources, according to another example embodiment. As shown in FIG. 7, cross-sectional view 700 includes a display layer 702 and a backlight assembly 750, each of which are respective further examples of display 110 and backlight assembly 108, as described with respect to FIG. 1. In accordance with an embodiment, backlight assembly 750 is attached to display layer 702 in any of the manners described with respect to display layer 602 and backlight assembly 650A of FIG. 6A.

Backlight assembly 750 includes a diffusion layer 704, one or more prism sheets 706 ("prism sheets 706" herein), a waveguide layer 708, a reflective layer 710, one or more pyramid sheets 712 ("pyramid sheets 712" herein), an array layer 742, and a light source 718A. Diffusion layer 704, prism sheets 706, waveguide layer 708, pyramid sheets 712, and light source 718A are each respective examples of diffusion layer 402, prism sheets 404, waveguide layer 406, pyramid sheets 430, and light source 410A, as each described with respect to FIGS. 4A and 4B. Waveguide layer 708 has opposing first and second surfaces 734 and 736 and opposing first and second edges 738 and 740.

Array layer 742 is a further example of array layer 408 of FIG. 4. As shown in FIG. 7, array layer 742 comprises a light source layer 714 (comprising light sources 720A and 720B) and a mounting layer 716. Light sources 720A and 720B are further examples of light sources 412A-412P, as described with respect to FIGS. 4A and 4B. Light sources 720A and 720B are mounted to mounting layer 716. In accordance with an embodiment, mounting layer 716 is a printed circuit board or a flexible printed circuit board. In some embodiments, a portion of mounting layer 716 is at least partially reflective (e.g., as a diffused reflective layer (e.g., a white diffusion layer), as a specular reflective layer, etc.).

Reflective layer 710 is a further example of reflective layer 120 (as described with respect to FIG. 1) and is arranged between waveguide layer 708 and light sources 720A-720B. Reflective layer 710 is a partially reflective sheet or film that reflects a portion of light received by reflective layer 710. For example, in a particular example, reflective layer 710 is a fifty percent reflective sheet that reflects fifty percent of (or approximately fifty percent of) the light received by reflective layer 710.

With respect to reflective layer 710, FIG. 7 illustrates how light is passed from backlight assembly 750 to display layer 702. For instance, suppose light sources 718A and 720B are in an "on" state (i.e., light sources 718A and 720B are illuminated). With respect to light source 718A, light source 718A emits light (represented as light 722A and 722B), which enters (i.e., is transmitted into) waveguide layer 708 at edge 738. A portion of light emitted by light source 718A (represented as light 722A) passes through surface 736, prism sheets 706, and diffusion layer 704 as extracted light 752. Extracted light 752 is received by display layer 702.

Some of the light emitted by light source 718A (represented as light 722B) is directed away from surface 736 of waveguide layer 708. Backlight assembly 750 is configured to recapture at least a portion of light 722B. For instance, as shown in FIG. 7, light 722B is received by reflective layer 710. Reflective layer 710 reflects a portion of light 722B (e.g., 50%) into waveguide layer 708 through surface 734 as reflected light 724A. Reflected light 724A passes through surface 736, prism sheets 706, and diffusion layer 704 as extracted light 754. Extracted light 754 is received by display layer 702. Another portion of light 722B (e.g., 50%) passes through reflective layer 710 as light 724B. Depending on the configuration of backlight assembly 750, light 724B may be considered "lost" light or may be further recirculated (e.g., reflected off of mounting layer 716 and toward reflective layer 710). By utilizing a reflective layer arranged between light sources 720A-720B and waveguide layer 708 in this manner, backlight assembly 750 is able to recover at least a portion (e.g., 50%) of light emitted by edge lights (e.g., light source 718A) that would otherwise be lost, thereby increasing the light output by backlight assembly 750 when utilizing edge light sources.

With respect to light source 720B, light source 720B emits light 726. Light 726 is received by reflective layer 710. Reflective layer 710 reflects a portion of light 726 (50%) away from surface 734 of waveguide layer 708 as reflected light 728A. Another portion of light 726 (50%) passes through reflective layer 710 as light 728B. Light 728B passes through surface 736, prism sheets 706, and diffusion layer 704 as extracted light 758. Extracted light 758 is received by display layer 702.

As stated above, reflective layer 710 reflects a portion of light 726 as reflected light 728A. Reflected light 728A recirculates through pyramid sheets 712 (which further scatters and distributes reflected light 728A) and into mounting layer 716. Mounting layer 716 reflects reflected light 728A toward surface 734 as reflected light 730. Reflected light 730 recirculates through pyramid sheets 712 (further scattering and/or distributing reflected light 730) and is received by reflected layer 710. In a similar manner described with respect to light 726, reflective surface 710 reflects a first portion of reflected light 730 as reflected light 732A and passes a second portion of reflected light 730 as light 732B. Reflected light 732A is reflected away from waveguide layer 708 in a similar manner as reflected light 728A and the process of recirculating and reflecting light continues (not shown in FIG. 7 for illustrative brevity and clarity). Light 732B passes through surface 736, prism sheets 706, and diffusion layer 704 as extracted light 756. Extracted light 756 is received by display layer 702.

As discussed above (and elsewhere herein) backlight assembly 750 includes a (partially) reflective layer 710 arranged in between light sources 720A-720B and waveguide layer 708. The inclusion of reflective layer 710 causes a portion of light emitted by array light sources (e.g., light sources 720A and 720B) to be reflected back through pyramid sheets 712 and "recirculate" as described above. This causes the light emitted by the array light sources to spread (or scatter) further in a shorter distance. Accordingly, some embodiments of backlight assembly 750 may utilize fewer layers configured to scatter light (such as pyramid sheets 712). This allows for a thinner backlight assembly while still sufficiently scattering light emitted by light sources 720A and 720B.

Furthermore, since the configuration of backlight assembly 750 enables light emitted by array light sources to spread further, a single array light source of backlight assembly 750 may provide light for a larger corresponding portion of a display area of a display device including backlight assembly 750 (e.g., display device 106 of FIG. 1). Accordingly, backlight assemblies implementing this feature may utilize fewer array light sources to provide extracted light to a display layer; therefore, the manufacturing complexity and material costs are reduced.

Figure 8:
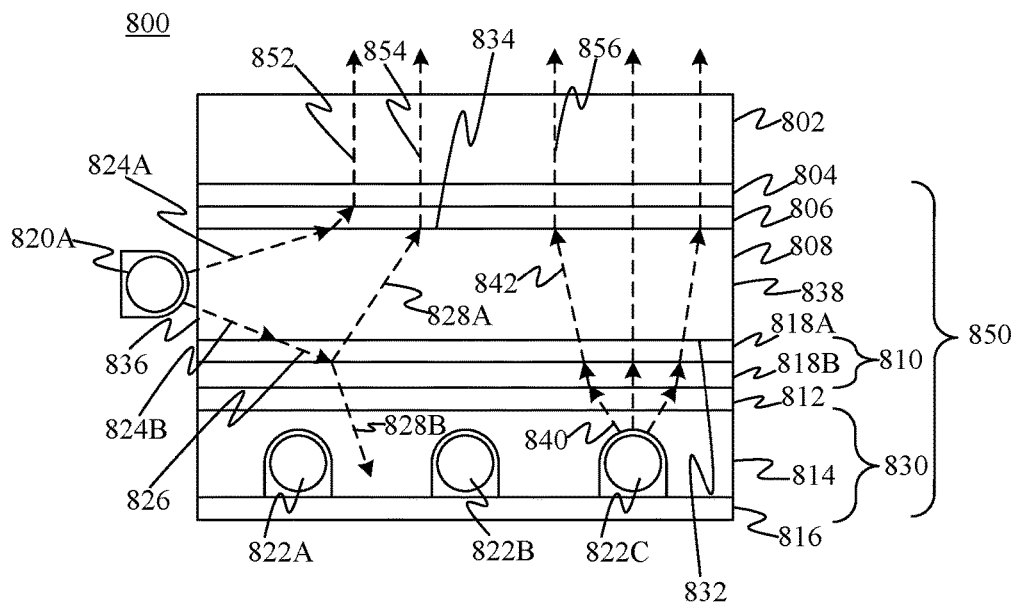
FIG. 8 shows a cross-sectional view of a display layer and a backlight assembly that includes edge light sources and array light sources, according to another example embodiment.

In some embodiments of backlight assembly 108, other types of reflective layers may be arranged between the waveguide layer and the array layer. For instance, a reflective layer may be configured to pass light emitted by array light sources and reflect (at least a portion of) light emitted by edge light sources. For example, FIG. 8 shows a cross-sectional view 800 of a backlight assembly that includes edge light sources and array light sources, according to another example embodiment. As shown in FIG. 8, cross-sectional view 800 includes a display layer 802 and a backlight assembly 850, each of which are respective further examples of display 110 and backlight assembly 108, as described with respect to FIG. 1. In accordance with an embodiment, backlight assembly 850 is attached to display layer 802 in any of the manners described with respect to display layer 602 and backlight assembly 650A of FIG. 6A.

Backlight assembly 850 includes a diffusion layer 804, one or more prism sheets 806 ("prism sheets 806" herein), a waveguide layer 808, a reflective layer 810, one or more pyramid sheets 812 ("pyramid sheets 812" herein), an array layer 830, and a light source 820A. Diffusion layer 804, prism sheets 806, waveguide layer 808, pyramid sheets 812, array layer 830, and light source 820A are each respective examples of diffusion layer 402, prism sheets 404, waveguide layer 406, pyramid sheets 430, array layer 408, and light source 410A, as each described with respect to FIGS. 4A and 4B. Waveguide layer 808 has opposing first and second surfaces 832 and 834 and opposing first and second edges 836 and 838.

As shown in FIG. 8, array layer 830 comprises a light source layer 814 (comprising light sources 822A-822C) and a mounting layer 816. Light sources 822A-822C are further examples of light sources 412A-412P, as described with respect to FIGS. 4A and 4B. Light sources 822A-822C are mounted to mounting layer 816. In the example of FIG. 8, light sources 822A-822C are color light sources (e.g., red light sources, green light sources, blue light sources, etc.). In accordance with an embodiment, mounting layer 816 is a printed circuit board or a flexible printed circuit board. In some embodiments, a portion of mounting layer 816 is at least partially reflective (e.g., as a diffused reflective layer (e.g., a white diffusion layer), as a specular reflective layer, etc.).

Reflective layer 810 is a further example of reflective layer 120 (as described with respect to FIG. 1) and is arranged between waveguide layer 808 and light sources 822A-822C. Reflective layer 810 comprises a color conversion sublayer 818A and a color reflective sublayer 818B. Color conversion sublayer 818A is configured to convert light that passes through it from a first color to a second color. For instance, color conversion sublayer 818A in accordance with an embodiment is configured to convert light emitted by array light sources (e.g., light sources 822A-822C) from colored light (e.g., blue light) to white light. Color conversion sublayer 818A may comprise one or more phosphors configured to convert light that passes through the sublayer. For instance, in accordance with an embodiment, color conversion sublayer 818A comprises a potassium fluorosilicate (KSF) phosphor and a sialon (e.g., B-SiAlON) phosphor to convert blue light emitted by light sources 822A-822C to white light. In an alternative embodiment, color conversion sublayer 818A is a quantum dot color conversion sublayer.

Color reflective sublayer 818B is a selective color reflection layer that selectively reflects a wavelength or range of wavelengths of light. In accordance with an embodiment, color reflective sublayer 818B is configured to allow light emitted by light sources 822A-822C to pass through (e.g., without reflecting the light). For instance and as a non-limiting example, suppose light sources 822A-822C are configured to emit blue light. In this context, color reflective sublayer 818B is configured to reflect yellow light (e.g., not blue light), thereby enabling light emitted by light sources 822A-822C to pass through color reflective sublayer 818B and into color conversion sublayer 818A.

With respect to reflective layer 810, FIG. 8 illustrates how light is passed from backlight assembly 850 to display layer 802. For instance, suppose light sources 820A and 822C are in an "on" state (e.g., light sources 820A and 822C are illuminated). Further suppose light source 820A is configured to emit cool white light (i.e., white light that is has a color temperature above neutral white light (e.g., white light with a color temperature above 6000K)) and light source 822C is configured to emit blue light. Further still, suppose color conversion sublayer 818A is configured to convert blue light to white light. With respect to light source 820A, light source 820 emits light (represented as light 824A and 824B), which enters (i.e., is transmitted into) waveguide layer 808 at edge. A portion of light emitted by light source 820A (represented as light 824A) passes through surface, prism sheets 806, and diffusion layer 804 as extracted light 852. Extracted light 852 is received by display layer 802.

Some of the light emitted by light source 820A (represented as light 824B) is directed away from surface of waveguide layer 808. Backlight assembly 850 is configured to recapture at least a portion of light 824B. Color conversion sublayer 818A converts light 824B into converted light 826. Converted light 826 is (mostly or nearly) yellow light (e.g., a portion of converted light 826 contains white light as a result of the additional blue light included in light 824B). Color reflective sublayer 818B receives converted light 826 and reflects the yellow portion of converted light 826 into waveguide layer 808 through surface 832 as reflected light 828A. Reflected light 828A passes through surface 834, prism sheets 806, and diffusion layer 804 as extracted light 854. Extracted light 854 is received by display layer 802.

As shown in FIG. 8, a portion of converted light 826 is not reflected by color reflective sublayer 818B and instead passes through color reflective sublayer 818B, pyramid sheets 812, and light source layer 814 as light 828B. Depending on the implementation, light 828B is "lost" light or a portion of light 828B may be recaptured using an additional reflective surface (e.g., as described with respect to FIG. 6A). In an alternative embodiment, light source 820A is configured such that light emitted by light source 820A (e.g., light 824B) when converted by color conversion sublayer 818A (e.g., as converted light 826) is completely reflected by color reflective sublayer 818B (e.g., as reflected light 828A). For instance, light source 820A may emit neutral or warm white light (i.e., white light that is has a color temperature below neutral white light (e.g., white light with a color temperature below 3000K)) that, when converted by color conversion sublayer 818A, is completely reflected by color reflective sublayer 818B.

With respect to light source 822C, light source 822C emits light 840. As noted above, in this example, light 840 is blue light. Light 840 passes through color reflective sublayer 818B and is received by color conversion sublayer 818A. Color conversion sublayer 818B converts light 840 to light 842. Light 842 is (e.g., neutral) white light. Light 842 enters waveguide layer 808 through surface 832 and passes through surface 834, prism sheets 806, and diffusion layer 804 as extracted light 856. Extracted light 856 is received by display layer 802.

Thus, example embodiments of a backlight assembly that utilizes a color conversion sublayer and a color reflective sublayer to recapture a portion of light emitted by edge light sources have been described. By utilizing a color conversion sublayer and a color reflective sublayer in these manners, backlight assembly 850 is able to recover at least a portion of (e.g., two-thirds of, or even greater than two-thirds of) light emitted by edge lights (e.g., light source 820A) that would otherwise be lost, thereby increasing the light output by backlight assembly 850 when utilizing edge light sources.

C. Example Backlight Assembly Embodiments with Multiple Reflective Layers

Figure 9:
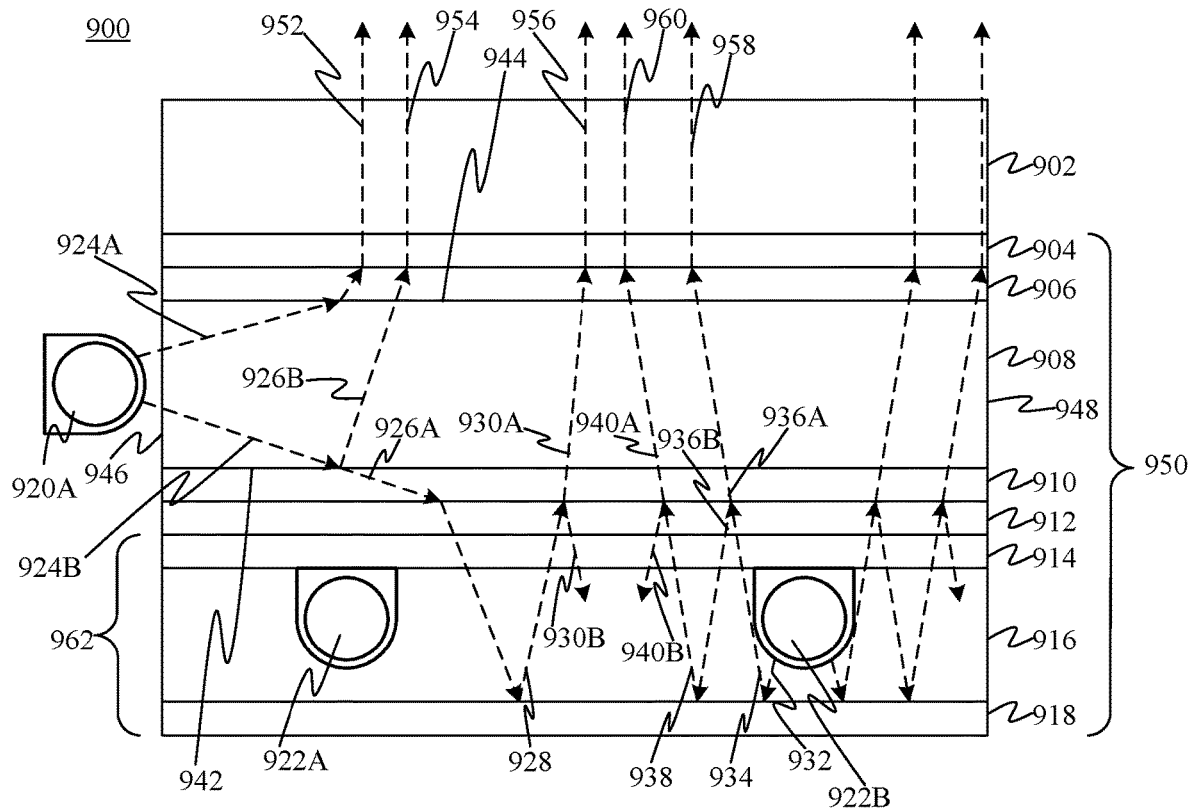
FIG. 9 shows a cross-sectional view of a display layer and a backlight assembly that includes edge light sources and array light sources, according to another example embodiment.

In some embodiments of backlight assembly 108, multiple reflective layers are used to recapture. For instance, FIG. 9 shows a cross-sectional view 900 of a backlight assembly that includes edge light sources and array light sources, according to another example embodiment. As shown in FIG. 9, cross-sectional view 900 includes a display layer 902 and a backlight assembly 950, each of which are respective further examples of display 110 and backlight assembly 108, as described with respect to FIG. 1. In accordance with an embodiment, backlight assembly 950 is attached to display layer 902 in any of the manners described with respect to display layer 602 and backlight assembly 650A of FIG. 6A.

Backlight assembly 950 is an example embodiment of a backlight assembly that utilizes features of backlight assembly 650B and backlight assembly 750, as each respectively described with respect to FIGS. 6 and 7. As shown in FIG. 9, backlight assembly 950 includes a diffusion layer 904, one or more prism sheets 906 ("prism sheets 906" herein), waveguide layer 908, a first reflective layer 910, one or more pyramid sheets 612 ("pyramid sheets 612" herein), an array layer 962, and a light source 920A. Diffusion layer 904, prism sheets 906, waveguide layer 908, pyramid sheets 912, and light source 920A are each respective examples of diffusion layer 402, prism sheets 404, waveguide layer 406, pyramid sheets 430, and light source 410A, as described with respect to FIGS. 4A and 4B. Waveguide layer 908 has opposing first and second surfaces 942 and 944 and opposing first and second edges 946 and 948.

Array layer 962 is a further example of array layer 408 of FIG. 4. As shown in FIG. 9, array layer 962 comprises a transparent sublayer 914, a light source layer 916 (comprising light sources 922A and 922B), and a reflective layer 918. Transparent sublayer 914 in accordance with an embodiment is an optically clear flexible printed circuit board to which light sources 922A and 922B are mounted. In accordance with an embodiment, light source layer 916 includes an optically clear resin, film, or other material that surrounds light sources 922A and 922B. Light sources 922A and 922B are examples of light sources 412A-412P, as described with respect to FIGS. 4A and 4B. Light sources 922A and 922B are oriented toward reflective layer 918 and away from surface 942 of waveguide layer 908, in a similar manner as described with respect to light sources 618-618C of backlight assembly 650B of FIG. 6B.

Reflective layer 918 is a further example of reflective layer 120 (as described with respect to FIG. 1) and is arranged beneath light sources 922A-922B (such that light sources 922A and 922B are arranged between reflective layer 918 and waveguide layer 908). Reflective layer 918 may be a specular reflective surface, a diffused reflective surface, or another type of reflective surface. Reflective layer 918 is configured to reflect light transmitted by light source 920A (and other edge light sources of backlight assembly 950, not shown in FIG. 9) and light sources 922A-922B (and other array light sources of backlight assembly 950, not shown in FIG. 9) into (or toward) waveguide layer 908 through surface 942 of waveguide layer 908 (e.g., in a similar manner as reflective surface 614 of backlight 650B, as described with respect to FIG. 6B).

Reflective layer 910 is also a further example of reflective layer 120 (as described with respect to FIG. 1) and is arranged between waveguide layer 908 and light sources 922A-922B. Reflective layer 910 is a partially reflective sheet or film that reflects a portion of light received by reflective layer 910. For example, in a particular example, reflective layer 910 is a fifty percent reflective sheet that reflects fifty percent of (or approximately fifty percent of) the light received by reflective layer 910 (e.g., in a similar manner as reflective layer 710 of backlight 750, as described with respect to FIG. 7).

As noted above, backlight assembly 950 is configured to incorporate features similar to backlight 650B of FIG. 6B and backlight 750 of FIG. 7. To illustrate the operation of light sources 920A, 922A, and 922B with respect to backlight assembly 950, FIG. 9 includes representations of light emitted by light sources 920A and 922B. In this example, light sources 920A and 922B are in an "on" state (i.e., light sources 920A and 922B are illuminated). With respect to light source 920A, light source 920A emits light (represented as light 924A and 924B), which enters (i.e., is transmitted into) waveguide layer 908 at edge 946. A portion of light emitted by light source 920A (represented as light 924A) passes through surface 944, prism sheets 906, and diffusion layer 904 as extracted light 952. Extracted light 952 is received by display layer 902.

Some of the light emitted by light source 920A (represented as light 924B) is directed away from surface 944 of waveguide layer 908. Backlight assembly 950 is configured to recapture at least a portion of light 924B. For instance, as shown in FIG. 9, light 924B is received by reflective layer 910. Reflective layer 910 reflects a portion of light 924B (e.g., 50%) into waveguide layer 908 through surface 942 as reflected light 926B. Reflected light 926B passes through surface 944, prism sheets 906, and diffusion layer 904 as extracted light 954. Extracted light 954 is received by display layer 902.

Another portion of light 924B (e.g., 50%) passes through reflective layer 910, pyramid sheets 912, transparent sublayer 914, and light source layer 916 as light 926A. Reflective surface 918 is configured to reflect light 926A as reflected light 928. Reflected light 928 passes through light source layer 916 and transparent sublayer 914, through pyramid sheets 912 (which further scatter light 928), and into reflective surface 910. Reflective surface 910 reflects a portion of reflected light 928 (e.g., 50%) as reflected light 930B, which recirculates through pyramid sheets 912 and the process of recirculating and reflecting light continues (not shown in FIG. 9 for illustrative brevity and clarity). Another portion of reflected light 928 (e.g., 50%) passes through reflective surface 910 as light 930A. Light 930A enters waveguide 908 through surface 942 and passes through surface 944, prism sheets 906, and diffusion layer 908 as extracted light 956. Extracted light 956 is received by display layer 902.

With respect to light source 922B, light source 922B, light source 922B emits light (represented as light 932). In particular, light source 922B transmits light 932 toward reflective layer 918 to cause reflective layer 918 to reflect light 932 into (pyramid sheets 912) reflective layer 910 as reflected light 934. A portion of reflected light 934 (e.g., 50%) passes through reflective layer 910 and into waveguide layer 908 through surface 942 as light 936A. Light 936A passes through surface 944, prism sheets 906, and diffusion layer 904 as extracted light 958. Extracted light 958 is received by display layer 902.

Another portion of reflected light 934 (e.g., 50%) is reflected by reflective layer 910 as reflected light 936B. Reflected light 936 recirculates through pyramid sheets 912 (which further scatter/distribute reflected light 936), transparent sublayer 914, and light source layer 916. Reflective layer 918 reflects light 936B toward surface 942 and into (pyramid sheets 912) reflective layer 910 as reflected light 938. Reflective surface 910 reflects a portion of reflected light 938 (e.g., 50%) as reflected light 940B, which recirculates through pyramid sheets 912 and the process of recirculating and reflecting light continues (not shown in FIG. 9 for illustrative brevity and clarity). Another portion of reflected light 938 (e.g., 50%) passes through reflective surface 910 as light 940A. Light 940A enters waveguide 908 through surface 942 and passes through surface 944, prism sheets 906, and diffusion layer 908 as extracted light 960. Extracted light 960 is received by display layer 902.

By implementing multiple reflective layers, backlight assembly 950 may further reduce the number of layers needed to diffuse light emitted by array light sources (e.g., light sources 922A and 922B). For instance, since light is recirculated through pyramid sheets 912 between reflective layers 910 and 918, the light is further distributed/scattered. Furthermore, orienting light sources 922A and 922B away from waveguide layer 908 and toward reflective layer 918 causes initial scattering of light emitted by light sources 922A and 922B, further increasing the distribution of light in a shorter distance. Therefore, the number of pyramid sheets (or other types of light diffusion/scattering/distribution sheets). This allows for a thinner backlight assembly that sufficiently scatters light emitted by light sources 922A and 922B. Further still, as discussed with respect to FIG. 6B, orienting array light sources in this manner reduces or eliminates the presence of hot spots, improving the uniformity of extracted light received by display layer 602. Moreover, as discussed with respect to FIG. 7, the recirculation of light emitted by a single array light allows for an array light to provide backlight for a larger corresponding portion of a display area of a display device including backlight assembly 950 (e.g., display device 106 of FIG. 1). Accordingly, backlight assemblies implementing this feature may utilize fewer array light sources to provide extracted light to a display layer; therefore, the manufacturing complexity and material costs are reduced.

FIG. 9 illustrates an example embodiment that combines features of backlight assembly 650B of FIG. 6B and backlight assembly 750 of FIG. 7 to provide a backlight assembly that utilizes multiple reflective layers. However, it is also contemplated herein that other combinations of reflective layers may be used. For instance, in another example embodiment, a backlight assembly combines features of backlight assembly 650B and backlight assembly 850 of FIG. 8. In this manner, a backlight assembly that includes color array light sources is able to reduce hot spots and improve light scattering, while increasing light output by the backlight assembly when utilizing edge light sources. Other implementations of backlight assemblies that utilize multiple reflective layers are also possible (e.g., a backlight assembly that includes reflective layer 614 of FIG. 6A, orients light sources 618A-618C as described with respect to FIG. 6A, and includes reflective layer 710 of FIG. 7, a backlight assembly that includes reflective layer 614 of FIG. 6A, reflective layer 710 of FIG. 7, and reflective layer 810 of FIG. 8, and/or any other combination of reflective layers described elsewhere herein).

VI. Example Computer System Implementation

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
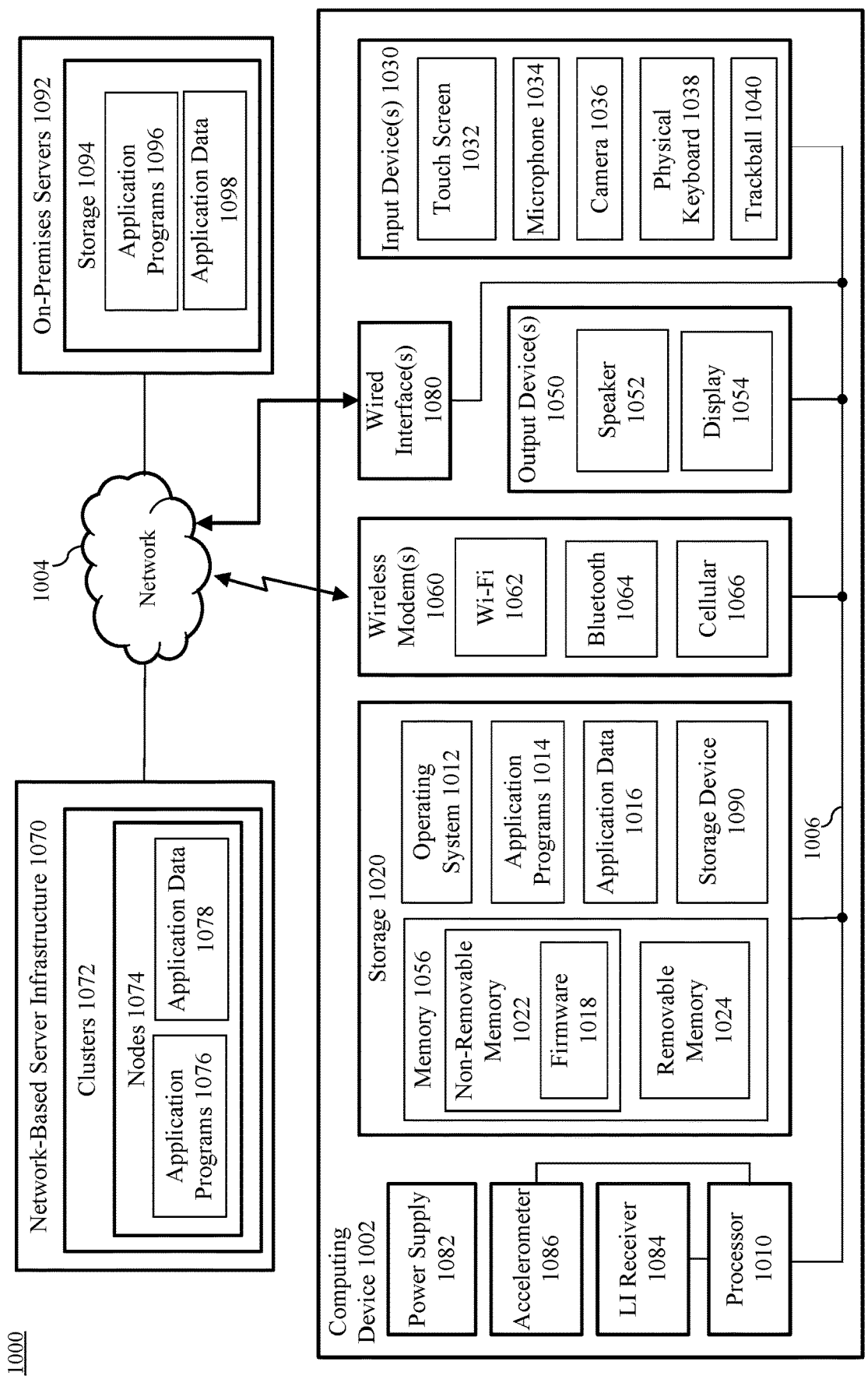
FIG. 10 shows a block diagram of an example computing system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 10. FIG. 10 shows a block diagram of an exemplary computing environment 1000 that includes a computing device 1002.

Computing device 1002 is an example of user device 102 of FIGS. 1 and 2 and/or image source 240 of FIG. 2, each of which may include one or more of the components of computing device 1002. In some embodiments, computing device 1002 is communicatively coupled with devices (not shown in FIG. 10) external to computing environment 1000 via network 1004. Network 1004 comprises one or more networks such as local area networks (LANs), wide area networks (WANs), enterprise networks, the Internet, etc., and may include one or more wired and/or wireless portions. Network 1004 may additionally or alternatively include a cellular network for cellular communications. Computing device 1002 is described in detail as follows.

Computing device 1002 can be any of a variety of types of computing devices. For example, computing device 1002 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1002 may alternatively be a stationary computing device such as a desktop computer, a personal computer (PC), a stationary server device, a minicomputer, a mainframe, a supercomputer, etc.

As shown in FIG. 10, computing device 1002 includes a variety of hardware and software components, including a processor 1010, a storage 1020, one or more input devices 1030, one or more output devices 1050, one or more wireless modems 1060, one or more wired interfaces 1080, a power supply 1082, a location information (LI) receiver 1084, and an accelerometer 1086. Storage 1020 includes memory 1056, which includes non-removable memory 1022 and removable memory 1024, and a storage device 1090. Storage 1020 also stores operating system 1012, application programs 1014, and application data 1016. Wireless modem(s) 1060 include a Wi-Fi modem 1062, a Bluetooth modem 1064, and a cellular modem 1066. Output device(s) 1050 includes a speaker 1052 and a display 1054. Display 1054 is an example of display device 106, as described with respect to FIGS. 1 and 2. In accordance with an embodiment, display 1054 includes backlight assembly 108 and/or display layer 110 as described with respect to FIG. 1, backlight assembly 108 and/or LC display layer 206 as described with respect to FIG. 2, backlight assembly 420 as described with respect to FIGS. 4A and 4B, display layer 602 and/or backlight assembly 650A as described with respect to FIG. 6A, display layer 602 and/or backlight assembly 650B as described with respect to FIG. 6B, display layer 702 and/or backlight assembly 750 as described with respect to FIG. 7, display layer 802 and/or backlight assembly 850 as described with respect to FIG. 8, and/or display layer 902 and/or backlight assembly 950 as described with respect to FIG. 9, along with any components and/or subcomponents thereof. Input device(s) 1030 includes a touch screen 1032, a microphone 1034, a camera 1036, a physical keyboard 1038, and a trackball 1040. Not all components of computing device 1002 shown in FIG. 10 are present in all embodiments, additional components not shown may be present, and any combination of the components may be present in a particular embodiment. These components of computing device 1002 are described as follows.

A single processor 1010 (e.g., central processing unit (CPU), microcontroller, a microprocessor, signal processor, ASIC (application specific integrated circuit), and/or other physical hardware processor circuit) or multiple processors 1010 may be present in computing device 1002 for performing such tasks as program execution, signal coding, data processing, input/output processing, power control, and/or other functions. Processor 1010 may be a single-core or multi-core processor, and each processor core may be single-threaded or multithreaded (to provide multiple threads of execution concurrently). Processor 1010 is configured to execute program code stored in a computer readable medium, such as program code of operating system 1012 and application programs 1014 stored in storage 1020. Operating system 1012 controls the allocation and usage of the components of computing device 1002 and provides support for one or more application programs 1014 (also referred to as "applications" or "apps"). Application programs 1014 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1002 can communicate with any other component according to function, although not all connections are shown for ease of illustration. For instance, as shown in FIG. 10, bus 1006 is a multiple signal line communication medium (e.g., conductive traces in silicon, metal traces along a motherboard, wires, etc.) that may be present to communicatively couple processor 1010 to various other components of computing device 1002, although in other embodiments, an alternative bus, further buses, and/or one or more individual signal lines may be present to communicatively couple components. Bus 1006 represents one or more of any of several types of bus structures, including a memory bus or memory controller, a peripheral bus, an accelerated graphics port, and a processor or local bus using any of a variety of bus architectures.

Storage 1020 is physical storage that includes one or both of memory 1056 and storage device 1090, which store operating system 1012, application programs 1014, and application data 1016 according to any distribution. Non-removable memory 1022 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1022 may include main memory and may be separate from or fabricated in a same integrated circuit as processor 1010. As shown in FIG. 10, non-removable memory 1022 stores firmware 1018, which may be present to provide low-level control of hardware. Examples of firmware 1018 include BIOS (Basic Input/Output System, such as on personal computers) and boot firmware (e.g., on smart phones). Removable memory 1024 may be inserted into a receptacle of or otherwise coupled to computing device 1002 and can be removed by a user from computing device 1002. Removable memory 1024 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1090 may be present that are internal and/or external to a housing of computing device 1002 and may or may not be removable. Examples of storage device 1090 include a hard disk drive, a SSD, a thumb drive (e.g., a USB (Universal Serial Bus) flash drive), or other physical storage device.

One or more programs may be stored in storage 1020. Such programs include operating system 1012, one or more application programs 1014, and other program modules and program data. Examples of such application programs may include, for example, computer program logic (e.g., computer program code/instructions) for implementing one or more of backlight controller 212, display drivers 2140, LC controller 226, and/or image source 240, along with any components and/or subcomponents thereof, as well as the flowcharts/flow diagrams (e.g., flowcharts 300 and/or 500) described herein, including portions thereof, and/or further examples described herein.

Storage 1020 also stores data used and/or generated by operating system 1012 and application programs 1014 as application data 1016. Examples of application data 1016 include web pages, text, images, tables, sound files, video data, and other data, which may also be sent to and/or received from one or more network servers or other devices via one or more wired or wireless networks. Storage 1020 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1002 through one or more input devices 1030 and may receive information from computing device 1002 through one or more output devices 1050. Input device(s) 1030 may include one or more of touch screen 1032, microphone 1034, camera 1036, physical keyboard 1038 and/or trackball 1040 and output device(s) 1050 may include one or more of speaker 1052 and display 1054. Each of input device(s) 1030 and output device(s) 1050 may be integral to computing device 1002 (e.g., built into a housing of computing device 1002) or external to computing device 1002 (e.g., communicatively coupled wired or wirelessly to computing device 1002 via wired interface(s) 1080 and/or wireless modem(s) 1060). Further input devices 1030 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1054 may display information, as well as operating as touch screen 1032 by receiving user commands and/or other information (e.g., by touch, finger gestures, virtual keyboard, etc.) as a user interface. Any number of each type of input device(s) 1030 and output device(s) 1050 may be present, including multiple microphones 1034, multiple cameras 1036, multiple speakers 1052, and/or multiple displays 1054.

One or more wireless modems 1060 can be coupled to antenna(s) (not shown) of computing device 1002 and can support two-way communications between processor 1010 and devices external to computing device 1002 through network 1004, as would be understood to persons skilled in the relevant art(s). Wireless modem 1060 is shown generically and can include a cellular modem 1066 for communicating with one or more cellular networks, such as a GSM network for data and voice communications within a single cellular network, between cellular networks, or between the mobile device and a public switched telephone network (PSTN). Wireless modem 1060 may also or alternatively include other radio-based modem types, such as a Bluetooth modem 1064 (also referred to as a "Bluetooth device") and/or Wi-Fi 1062 modem (also referred to as an "wireless adaptor"). Wi-Fi modem 1062 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1002 can further include power supply 1082, LI receiver 1084, accelerometer 1086, and/or one or more wired interfaces 1080. Example wired interfaces 1080 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1080 of computing device 1002 provide for wired connections between computing device 1002 and network 1004, or between computing device 1002 and one or more devices/peripherals when such devices/peripherals are external to computing device 1002 (e.g., a pointing device, display 1054, speaker 1052, camera 1036, physical keyboard 1038, etc.). Power supply 1082 is configured to supply power to each of the components of computing device 1002 and may receive power from a battery internal to computing device 1002, and/or from a power cord plugged into a power port of computing device 1002 (e.g., a USB port, an A/C power port). LI receiver 1084 may be used for location determination of computing device 1002 and may include a satellite navigation receiver such as a Global Positioning System (GPS) receiver or may include other type of location determiner configured to determine location of computing device 1002 based on received information (e.g., using cell tower triangulation, etc.). Accelerometer 1086 may be present to determine an orientation of computing device 1002.

Note that the illustrated components of computing device 1002 are not required or all-inclusive, and fewer or greater numbers of components may be present as would be recognized by one skilled in the art. For example, computing device 1002 may also include one or more of a gyroscope, barometer, proximity sensor, ambient light sensor, digital compass, etc. Processor 1010 and memory 1056 may be co-located in a same semiconductor device package, such as being included together in an integrated circuit chip, FPGA, or system-on-chip (SOC), optionally along with further components of computing device 1002.

In embodiments, computing device 1002 is configured to implement any of the above-described features of flowcharts herein. Computer program logic for performing any of the operations, steps, and/or functions described herein may be stored in storage 1020 and executed by processor 1010.

In some embodiments, server infrastructure 1070 may be present in computing environment 1000 and may be communicatively coupled with computing device 1002 via network 1004. Server infrastructure 1070, when present, may be a network-accessible server set (e.g., a cloud computing platform). As shown in FIG. 10, server infrastructure 1070 includes clusters 1072. Each of clusters 1072 may comprise a group of one or more compute nodes and/or a group of one or more storage nodes. For example, as shown in FIG. 10, cluster 1072 includes nodes 1074. Each of nodes 1074 is accessible via network 1004 (e.g., in a "cloud computing platform" or "cloud-based" embodiment) to build, deploy, and manage applications and services. Any of nodes 1074 may be a storage node that comprises a plurality of physical storage disks, SSDs, and/or other physical storage devices that are accessible via network 1004 and are configured to store data associated with the applications and services managed by nodes 1074. For example, as shown in FIG. 10, nodes 1074 may store application data 1078.

Each of nodes 1074 may, as a compute node, comprise one or more server computers, server systems, and/or computing devices. For instance, a node 1074 may include one or more of the components of computing device 1002 disclosed herein. Each of nodes 1074 may be configured to execute one or more software applications (or "applications") and/or services and/or manage hardware resources (e.g., processors, memory, etc.), which may be utilized by users (e.g., customers) of the network-accessible server set. For example, as shown in FIG. 10, nodes 1074 may operate application programs 1076. In an implementation, a node of nodes 1074 may operate or comprise one or more virtual machines, with each virtual machine emulating a system architecture (e.g., an operating system), in an isolated manner, upon which applications such as application programs 1076 may be executed.

In an embodiment, one or more of clusters 1072 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1072 may be a datacenter in a distributed collection of datacenters. In embodiments, exemplary computing environment 1000 comprises part of a cloud-based platform such as Amazon Web Services® of Amazon Web Services, Inc., or Google Cloud Platform™ of Google LLC, although these are only examples and are not intended to be limiting.

In an embodiment, computing device 1002 may access application programs 1076 for execution in any manner, such as by a client application and/or a browser at computing device 1002. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1002 may additionally and/or alternatively synchronize copies of application programs 1014 and/or application data 1016 to be stored at network-based server infrastructure 1070 as application programs 1076 and/or application data 1078. For instance, operating system 1012 and/or application programs 1014 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1020 at network-based server infrastructure 1070.

In some embodiments, on-premises servers 1092 may be present in computing environment 1000 and may be communicatively coupled with computing device 1002 via network 1004. On-premises servers 1092, when present, are hosted within an organization's infrastructure and, in many cases, physically onsite of a facility of that organization. On-premises servers 1092 are controlled, administered, and maintained by IT (Information Technology) personnel of the organization or an IT partner to the organization. Application data 1098 may be shared by on-premises servers 1092 between computing devices of the organization, including computing device 1002 (when part of an organization) through a local network of the organization, and/or through further networks accessible to the organization (including the Internet). Furthermore, on-premises servers 1092 may serve applications such as application programs 1096 to the computing devices of the organization, including computing device 1002. Accordingly, on-premises servers 1092 may include storage 1094 (which includes one or more physical storage devices such as storage disks and/or SSDs) for storage of application programs 1096 and application data 1098 and may include one or more processors for execution of application programs 1096. Still further, computing device 1002 may be configured to synchronize copies of application programs 1014 and/or application data 1016 for backup storage at on-premises servers 1092 as application programs 1096 and/or application data 1098.

Embodiments described herein may be implemented in one or more of computing device 1002, network-based server infrastructure 1070, and on-premises servers 1092. For example, in some embodiments, computing device 1002 may be used to implement systems, clients, or devices, or components/subcomponents thereof, disclosed elsewhere herein. In other embodiments, a combination of computing device 1002, network-based server infrastructure 1070, and/or on-premises servers 1092 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1020. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1014) may be stored in storage 1020. Such computer programs may also be received via wired interface(s) 1080 and/or wireless modem(s) 1060 over network 1004. Such computer programs, when executed or loaded by an application, enable computing device 1002 to implement features of embodiments discussed herein. Accordingly, such computer programs represent controllers of the computing device 1002.

Embodiments are also directed to computer program products comprising computer code or instructions stored on any computer-readable medium or computer-readable storage medium. Such computer program products include the physical storage of storage 1020 as well as further physical storage types.

VII. Additional Exemplary Embodiments

A display system is described herein. The display system comprises a backlight assembly and a display layer. The backlight assembly comprises a transparent waveguide layer having a first surface, a plurality of first light sources arranged along an edge of the transparent waveguide layer, each of the first light sources configured to transmit light into the waveguide layer through the edge, and an array layer coupled to the first surface of the transparent waveguide layer. The array layer comprises a first reflective layer and a plurality of second light sources. The first reflective layer is configured to reflect the light transmitted by the plurality of first light sources into the waveguide layer through the first surface. The plurality of second light sources arranged between the first surface and the first reflective layer, each of the second light sources configured to transmit light into the waveguide layer through the first surface. The display layer is disposed proximate to the backlight assembly. The display layer is configured to selectively filter the light emitted from the backlight assembly.

In an implementation of the foregoing display system, the plurality of second light sources is mounted to a transparent sublayer and oriented toward the first reflective layer and away from the first surface; and to transmit light into the waveguide layer, the plurality of second light sources is configured to transmit light toward the first reflective layer to cause the first reflective layer to reflect the light transmitted by the plurality of second light sources into the waveguide layer through the first surface.

In an implementation of the foregoing display system, the backlight assembly further comprises a second reflective layer arranged between the first surface and the array layer, the second reflective layer configured to reflect a portion of the light transmitted by the plurality of first light sources into the waveguide layer through the first surface.

In an implementation of the foregoing display system, the second reflective layer comprises: a color conversion sublayer configured to convert the light transmitted by the plurality of second light sources from a first color to a second color; and a color reflective sublayer configured to reflect the portion of the light transmitted by the plurality of first light sources into the waveguide layer through the first surface.

In an implementation of the foregoing display system, the second reflective layer is further configured to reflect a portion of the light transmitted by the plurality of second light sources toward the first reflective layer.

In an implementation of the foregoing display system, the first reflective layer is a specular reflective layer.

In an implementation of the foregoing display system, the display system further comprises a backlight controller configured to: receive image data; determine, based on the image data, an average luminance level of a display area of the display layer is below a threshold; and responsive to the determination, illuminate a portion of the plurality of first light sources.

In an implementation of the foregoing display system, responsive to the determination, the backlight controller is further configured to maintain the plurality of second light sources in an off state.

In an implementation of the foregoing display system, the backlight controller is further configured to: determine, based on the image data, an average luminance level of a first zone of the display area is below the threshold and an average luminance level of a second zone of the display area is above the threshold, and illuminate a portion of the plurality of second light sources corresponding to the second zone. The portion of the plurality of first light sources corresponds to the first zone.

In an implementation of the foregoing display system, the display layer is a liquid crystal display layer.

A backlight assembly for a device is described. The backlight assembly comprises a transparent waveguide layer having a first surface, a plurality of first light sources, an array layer, and a first reflective layer. The plurality of first light sources is arranged along an edge of the transparent waveguide layer. Each of the first light sources is configured to transmit light into the waveguide layer through the edge. The array layer comprises a plurality of second light sources, each of the second light sources configured to transmit light into the waveguide layer through the first surface. The first reflective layer is arranged between the first surface of the transparent waveguide layer and the array layer. The first reflective layer is configured to: reflect a portion of the light transmitted by the plurality of first light sources into the waveguide layer through the first surface, and reflect a portion of the light transmitted by the plurality of second light sources away from the first surface.

In an implementation of the foregoing backlight assembly, the array layer further comprises a second reflective layer, the plurality of second light sources arranged between the first reflective layer and the second reflective layer, the second reflective layer configured to reflect the light transmitted by the plurality of first light sources into the waveguide layer through the first surface.

In an implementation of the foregoing backlight assembly, the plurality of second light sources is mounted to a transparent sublayer and are oriented toward the second reflective layer and away from the first surface. To transmit light into the waveguide layer, the plurality of second light sources is configured to transmit light toward the first reflective layer to cause the first reflective layer to reflect the light transmitted by the plurality of second light sources into the waveguide layer through the first surface.

In an implementation of the foregoing backlight assembly, the first reflective layer is a specular reflective layer.

Another backlight assembly for a device is described. In this implementation, the backlight assembly comprises a transparent waveguide layer having a first surface, a plurality of first light sources, and an array layer. The plurality of first light sources is arranged along an edge of the transparent waveguide layer, each of the first light sources configured to transmit light into the waveguide layer through the edge. The array layer is coupled to the first surface of the transparent waveguide layer. The array layer comprises a first reflective layer and a plurality of second light sources. The first reflective layer is configured to reflect the light transmitted by the plurality of first light sources into the waveguide layer through the first surface. The plurality of second light sources is arranged between the first surface and the first reflective layer, each of the second light sources configured to transmit light into the waveguide layer through the first surface.

In an implementation of the foregoing another backlight assembly, the plurality of second light sources is mounted to a transparent sublayer and oriented toward the first reflective layer and away from the first surface; and to transmit light into the waveguide layer, the plurality of second light sources is configured to transmit light toward the first reflective layer to cause the first reflective layer to reflect the light transmitted by the plurality of second light sources into the waveguide layer through the first surface.

In an implementation of the foregoing another backlight assembly, the backlight assembly further comprises a second reflective layer arranged between the first surface and the array layer, the second reflective layer configured to reflect a portion of the light transmitted by the plurality of first light sources into the waveguide layer through the first surface.

In an implementation of the foregoing another backlight assembly, the second reflective layer comprises: a color conversion sublayer configured to convert the light transmitted by the plurality of second light sources from a first color to a second color; and a color reflective sublayer configured to reflect the portion of the light transmitted by the plurality of first light sources into the waveguide layer through the first surface.

In an implementation of the foregoing another backlight assembly, the second reflective layer is further configured to reflect a portion of the light transmitted by the plurality of second light sources toward the first reflective layer.

In an implementation of the foregoing another backlight assembly, the first reflective layer is a specular reflective layer.

VIII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Furthermore, several example cross-sectional and top views of backlight assemblies have been shown. While only a few edge and/or array light sources are illustrated in each of these example views, implementations of the described embodiments may utilize any number greater than or less than the number of light sources shown. Further still, while particular arrangements of layers within a backlight assembly have been shown, it is also considered herein that layers may be arranged in different orders, some layers may be omitted entirely, and/or some layers may be combined into a single layer. Also, while example pyramid sheets, diffusion layers, and prism sheets have been described, it is also contemplated herein that other sheets and/or layers may be used for scattering and/or otherwise diffusing light through a backlight assembly, as would be understood by a person ordinarily skilled in the relevant art(s) having benefit of this disclosure. For example, pyramid sheets located between a waveguide layer and an array layer in one non-limiting example may be replaced with prism sheets.

Moreover, according to the described embodiments and techniques, any components of systems, user devices, display systems, display devices, backlight assemblies, display layers, and/or their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A display system comprising:
a backlight assembly comprising:
a transparent waveguide layer having a first surface,
a plurality of first light sources arranged along an edge of the transparent waveguide layer, each of the first light sources configured to transmit light into the waveguide layer through the edge, and
an array layer coupled to the first surface of the transparent waveguide layer, the array layer comprising:
a first reflective layer configured to reflect the light transmitted by the plurality of first light sources into the waveguide layer through the first surface, and
a plurality of second light sources arranged between the first surface and the first reflective layer, each of the second light sources configured to transmit light into the waveguide layer through the first surface, a first portion of the light transmitted by at least one of the second light sources reflected from the first reflective layer; and
a display layer disposed proximate to the backlight assembly, the display layer configured to selectively filter the light emitted from the backlight assembly.

2. The display system of claim 1, wherein the plurality of second light sources is mounted to a transparent sublayer and oriented toward the first reflective layer and away from the first surface; and
to transmit light into the waveguide layer, the plurality of second light sources is configured to transmit light toward the first reflective layer to cause the first reflective layer to reflect the light transmitted by the plurality of second light sources into the waveguide layer through the first surface.

3. The display system of claim 1, wherein the backlight assembly further comprises:
a second reflective layer arranged between the first surface and the array layer, the second reflective layer configured to reflect a second portion of the light transmitted by the plurality of first light sources into the waveguide layer through the first surface.

4. The display system of claim 3, wherein the second reflective layer comprises:
a color conversion sublayer configured to convert the light transmitted by the plurality of second light sources from a first color to a second color; and
a color reflective sublayer configured to reflect the second portion of the light transmitted by the plurality of first light sources into the waveguide layer through the first surface.

5. The display system of claim 3, wherein the second reflective layer is further configured to:
reflect the first portion of the light transmitted by the plurality of second light sources toward the first reflective layer.

6. The display system of claim 1, wherein the first reflective layer is a specular reflective layer.

7. The display system of claim 1, further comprising:
a backlight controller configured to:
receive image data;
determine, based on the image data, an average luminance level of a display area of the display layer is below a threshold; and
responsive to the determination, illuminate a portion of the plurality of first light sources.

8. The display system of claim 7, wherein, responsive to the determination, the backlight controller is further configured to maintain the plurality of second light sources in an off state.

9. The display system of claim 7, wherein
the backlight controller is further configured to:
determine, based on the image data, an average luminance level of a first zone of the display area is below the threshold and an average luminance level of a second zone of the display area is above the threshold, and
illuminate a portion of the plurality of second light sources corresponding to the second zone; and
wherein the portion of the plurality of first light sources corresponds to the first zone.

10. The display system of claim 1, wherein the display layer is a liquid crystal display layer.

11. A backlight assembly for a device comprising:
a transparent waveguide layer having a first surface;
a plurality of first light sources arranged along an edge of the transparent waveguide layer, each of the first light sources configured to transmit light into the waveguide layer through the edge;
an array layer comprising a plurality of second light sources, each of the second light sources configured to transmit light into the waveguide layer through the first surface; and
a first reflective layer arranged between the first surface of the transparent waveguide layer and the array layer, the first reflective layer configured to:
reflect a portion of the light transmitted by the plurality of first light sources into the waveguide layer through the first surface, and
reflect a portion of the light transmitted by the plurality of second light sources away from the first surface.

12. The backlight assembly of claim 11, wherein the array layer further comprises:
a second reflective layer, the plurality of second light sources arranged between the first reflective layer and the second reflective layer, the second reflective layer configured to reflect the light transmitted by the plurality of first light sources into the waveguide layer through the first surface.

13. The backlight assembly of claim 12, wherein the plurality of second light sources is mounted to a transparent sublayer and are oriented toward the second reflective layer and away from the first surface; and
to transmit light into the waveguide layer, the plurality of second light sources is configured to transmit light toward the first reflective layer to cause the first reflective layer to reflect the light transmitted by the plurality of second light sources into the waveguide layer through the first surface.

14. The backlight assembly of claim 11, wherein the first reflective layer is a specular reflective layer.

15. A backlight assembly for a device comprising:
a transparent waveguide layer having a first surface;
a plurality of first light sources arranged along an edge of the transparent waveguide layer, each of the first light sources configured to transmit light into the waveguide layer through the edge; and
an array layer coupled to the first surface of the transparent waveguide layer, the array layer comprising:
a first reflective layer, configured to reflect the light transmitted by the plurality of first light sources into the waveguide layer through the first surface, and
a plurality of second light sources arranged between the first surface and the first reflective layer, each of the second light sources configured to transmit light into the waveguide layer through the first surface, a first portion of the light transmitted by at least one of the second light sources reflected from the first reflective layer.

16. The backlight assembly of claim 15, wherein the plurality of second light sources is mounted to a transparent sublayer and oriented toward the first reflective layer and away from the first surface; and
to transmit light into the waveguide layer, the plurality of second light sources is configured to transmit light toward the first reflective layer to cause the first reflective layer to reflect the light transmitted by the plurality of second light sources into the waveguide layer through the first surface.

17. The backlight assembly of claim 15, further comprising:
a second reflective layer arranged between the first surface and the array layer, the second reflective layer configured to reflect a second portion of the light transmitted by the plurality of first light sources into the waveguide layer through the first surface.

18. The backlight assembly of claim 17, wherein the second reflective layer comprises:
a color conversion sublayer configured to convert the light transmitted by the plurality of second light sources from a first color to a second color; and
a color reflective sublayer configured to reflect the second portion of the light transmitted by the plurality of first light sources into the waveguide layer through the first surface.

19. The backlight assembly of claim 17, wherein the second reflective layer is further configured to:
reflect the portion of the light transmitted by the plurality of second light sources toward the first reflective layer.

20. The backlight assembly of claim 19, wherein the first reflective layer is a specular reflective layer.

* * * * *